(12) United States Patent
Kojima et al.

(10) Patent No.: US 11,496,009 B2
(45) Date of Patent: Nov. 8, 2022

(54) STATOR, ELECTRIC ROTATING MACHINE, AND ELECTRIC-POWERED VEHICLE

(71) Applicant: SUBARU CORPORATION, Tokyo (JP)

(72) Inventors: Haruka Kojima, Tokyo (JP); Nobuhiko Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 189 days.

(21) Appl. No.: 16/952,986

(22) Filed: Nov. 19, 2020

(65) Prior Publication Data

US 2021/0265887 A1 Aug. 26, 2021

(30) Foreign Application Priority Data

Feb. 25, 2020 (JP) .............................. JP2020-029132

(51) Int. Cl.
*H02K 3/12* (2006.01)
*H02K 3/28* (2006.01)
*H02K 1/16* (2006.01)
*H02K 1/276* (2022.01)
*H02K 3/50* (2006.01)

(52) U.S. Cl.
CPC .................. *H02K 3/12* (2013.01); *H02K 1/16* (2013.01); *H02K 1/276* (2013.01); *H02K 3/28* (2013.01); *H02K 3/505* (2013.01); *H02K 2203/09* (2013.01)

(58) Field of Classification Search
CPC ...... H02K 2203/09; H02K 1/16; H02K 1/276; H02K 3/505; H02K 3/28; H02K 3/12
See application file for complete search history.

(56) References Cited

U.S. PATENT DOCUMENTS

| | | | | |
|---|---|---|---|---|
| 6,914,356 B2 * | 7/2005 | Yamamura | ................ | H02K 3/50 310/71 |
| 7,180,217 B2 * | 2/2007 | Nakayama | ........... | B62D 5/0403 310/179 |
| 8,729,755 B2 * | 5/2014 | Nakagawa | ............. | H02K 5/225 310/71 |
| 9,337,694 B2 * | 5/2016 | Egami | .................... | H02K 3/522 |
| 9,484,782 B2 * | 11/2016 | Arai | ....................... | H02K 3/522 |
| 9,742,236 B2 * | 8/2017 | Kim | ....................... | H02K 3/522 |

(Continued)

FOREIGN PATENT DOCUMENTS

JP 2013-081351 A 5/2013

*Primary Examiner* — Robert W Horn
(74) *Attorney, Agent, or Firm* — McGinn IP Law Group, PLLC

(57) ABSTRACT

A stator includes a stator core, first to third phase windings, and a busbar unit. Each of the first to third phase windings includes segment conductors inserted into slots of the stator core, and has a power point and a neutral point each protruding from an end face of the stator core. The busbar unit includes first to third power busbars coupled respectively to the power points of the first to third phase windings, and a neutral busbar coupled to the neutral points of the first to third phase windings. In circumferential directions of the stator core, the neutral point of the third phase winding is disposed between the power points of the first and second phase windings, and the power point of the third phase winding is disposed between the neutral points of the first and second phase windings.

19 Claims, 23 Drawing Sheets

(56) References Cited

U.S. PATENT DOCUMENTS

| | | | | |
|---|---|---|---|---|
| 9,780,506 B2* | 10/2017 | Houzumi | ............. | H01R 25/161 |
| 10,367,388 B2* | 7/2019 | Kaneko | .................... | H02K 3/28 |
| 10,396,607 B2* | 8/2019 | Adachi | .................. | H02K 1/185 |
| 10,855,132 B2* | 12/2020 | Houzumi | ................. | H02K 3/28 |
| 2012/0037436 A1* | 2/2012 | Kwon | ...................... | H02K 3/50 |
| | | | | 310/71 |
| 2021/0265887 A1* | 8/2021 | Kojima | .................. | H02K 1/276 |
| 2021/0359562 A1* | 11/2021 | Katsu | ....................... | H02K 1/16 |
| 2021/0359568 A1* | 11/2021 | Goto | ................... | H02K 15/0081 |
| 2021/0367474 A1* | 11/2021 | Galloway | .............. | H02K 3/325 |
| 2021/0408856 A1* | 12/2021 | Fukunaga | ................ | H02K 3/50 |
| 2022/0052586 A1* | 2/2022 | Nagase | .................. | H02K 3/522 |
| 2022/0069659 A1* | 3/2022 | Lee | ........................ | H02K 5/225 |
| 2022/0077728 A1* | 3/2022 | Hanaoka | .................. | H02K 3/48 |
| 2022/0085681 A1* | 3/2022 | Kojima | .................. | H02K 3/505 |
| 2022/0140673 A1* | 5/2022 | Okamura | ................. | H02K 1/27 |
| | | | | 310/152 |
| 2022/0140686 A1* | 5/2022 | Hirai | ........................ | H02K 3/52 |
| | | | | 310/71 |
| 2022/0158519 A1* | 5/2022 | Kuroyanagi | ........... | H02K 11/33 |
| 2022/0185363 A1* | 6/2022 | Suzuki | ................. | B62D 5/0463 |

* cited by examiner

STATOR, ELECTRIC ROTATING MACHINE, AND ELECTRIC-POWERED VEHICLE

CROSS-REFERENCE TO RELATED APPLICATIONS

The present application claims priority from Japanese Patent Application No. 2020-029132 filed on Feb. 25, 2020, the entire contents of which are hereby incorporated by reference.

BACKGROUND

The technology relates to a stator, an electric rotating machine, and an electric-powered vehicle.

An electric rotating machine, such as an electric motor or an electric generator, includes a stator on which a stator coil is wound. Japanese Unexamined Patent Application Publication No. 2013-081351 discloses, as such a stator, a stator that uses a stator coil including segment coils each bent into a substantially U shape.

SUMMARY

An aspect of the technology provides a stator to be provided in an electric rotating machine. The stator includes a stator core, a first phase winding, a second phase winding, a third phase winding, and a busbar unit. The stator core has a cylindrical shape and a plurality of slots. The first phase winding includes a plurality of segment conductors inserted into the slots, and has a power point and a neutral point each protruding from an end face of the stator core. The second phase winding includes a plurality of segment conductors inserted into the slots, and has a power point and a neutral point each protruding from the end face of the stator core. The third phase winding includes a plurality of segment conductors inserted into the slots, and has a power point and a neutral point each protruding from the end face of the stator core. The busbar unit includes a first power busbar coupled to the power point of the first phase winding, a second power busbar coupled to the power point of the second phase winding, a third power busbar coupled to the power point of the third phase winding, and a neutral busbar coupled to the neutral points of the first phase winding, the second phase winding, and the third phase winding. In circumferential directions of the stator core, the neutral point of the third phase winding is disposed between the power point of the first phase winding and the power point of the second phase winding, and the power point of the third phase winding is disposed between the neutral point of the first phase winding and the neutral point of the second phase winding.

An aspect of the technology provides a stator to be provided in an electric rotating machine. The stator includes a stator core, a first phase winding, a second phase winding, a third phase winding, and a busbar unit. The stator core has a cylindrical shape and a plurality of slots. The first phase winding includes a plurality of segment conductors inserted into the slots, and has a power point and a neutral point each protruding from an end face of the stator core. The second phase winding includes a plurality of segment conductors inserted into the slots, and has a power point and a neutral point each protruding from the end face of the stator core. The third phase winding includes a plurality of segment conductors inserted into the slots, and has a power point and a neutral point each protruding from the end face of the stator core. The busbar unit includes a first power busbar coupled to the power point of the first phase winding, a second power busbar coupled to the power point of the second phase winding, a third power busbar coupled to the power point of the third phase winding, and a neutral busbar coupled to the neutral points of the first phase winding, the second phase winding, and the third phase winding. The first phase winding and the second phase winding are each wound on the stator core, while progressing in one of circumferential directions of the stator core, from the power point toward the neutral point. The third phase winding is wound on the stator core, while progressing in the other of the circumferential directions of the stator core, from the power point toward the neutral point.

An aspect of the technology provides an electric rotating machine including a stator and a rotor. The stator includes a stator core, a first phase winding, a second phase winding, a third phase winding, and a busbar unit. The stator core has a cylindrical shape and a plurality of slots. The first phase winding includes a plurality of segment conductors inserted into the slots, and has a power point and a neutral point each protruding from an end face of the stator core. The second phase winding includes a plurality of segment conductors inserted into the slots, and has a power point and a neutral point each protruding from the end face of the stator core. The third phase winding includes a plurality of segment conductors inserted into the slots, and has a power point and a neutral point each protruding from the end face of the stator core. The busbar unit includes a first power busbar coupled to the power point of the first phase winding, a second power busbar coupled to the power point of the second phase winding, a third power busbar coupled to the power point of the third phase winding, and a neutral busbar coupled to the neutral points of the first phase winding, the second phase winding, and the third phase winding. In circumferential directions of the stator core, the neutral point of the third phase winding is disposed between the power point of the first phase winding and the power point of the second phase winding, and the power point of the third phase winding is disposed between the neutral point of the first phase winding and the neutral point of the second phase winding. The rotor includes a plurality of permanent magnets arranged in the circumferential directions, and is provided on an inner circumference side of the stator to be relatively rotatable with respect to the stator.

An aspect of the technology provides an electric-powered vehicle including an electric rotating machine as a driving source. The electric rotating machine includes a stator and a rotor. The stator includes a stator core, a first phase winding, a second phase winding, a third phase winding, and a busbar unit. The stator core has a cylindrical shape and a plurality of slots. The first phase winding includes a plurality of segment conductors inserted into the slots, and has a power point and a neutral point each protruding from an end face of the stator core. The second phase winding includes a plurality of segment conductors inserted into the slots, and has a power point and a neutral point each protruding from the end face of the stator core. The third phase winding includes a plurality of segment conductors inserted into the slots, and has a power point and a neutral point each protruding from the end face of the stator core. The busbar unit includes a first power busbar coupled to the power point of the first phase winding, a second power busbar coupled to the power point of the second phase winding, a third power busbar coupled to the power point of the third phase winding, and a neutral busbar coupled to the neutral points of the first phase winding, the second phase winding, and the third phase winding. In circumferential directions of the stator core, the neutral point of the third phase winding is disposed between the power point of the first phase winding and the power point of the second phase winding, and the power point of the third phase winding is disposed between the neutral point of the first phase winding and the neutral point of the second phase winding. The rotor includes a plurality of permanent magnets arranged in the circumferential directions, and is provided on an inner circumference side of the stator to be relatively rotatable with respect to the stator.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

The following description describes, as an example of an electric rotating machine 11 to be provided with a stator 10 according to an example embodiment of the technology, an electric rotating machine to be mounted on an electric-powered vehicle, such as an electric vehicle or a hybrid electric vehicle, as a driving source. In the example embodiment, the electric rotating machine may be a three-phase alternating-current synchronous motor generator. However, without being limited to this example, the electric rotating machine 11 may be any electric rotating machine, as long as the electric rotating machine includes a stator to which segment coils 40 are attached. A drive shaft of the vehicle may be coupled to a rotor of the motor generator to be able to transmit output torque of the rotor. Drive wheels of the vehicle may receive the torque transmitted via the drive shaft to propel the vehicle.

[Structure of Electric Rotating Machine]

Figure 1:
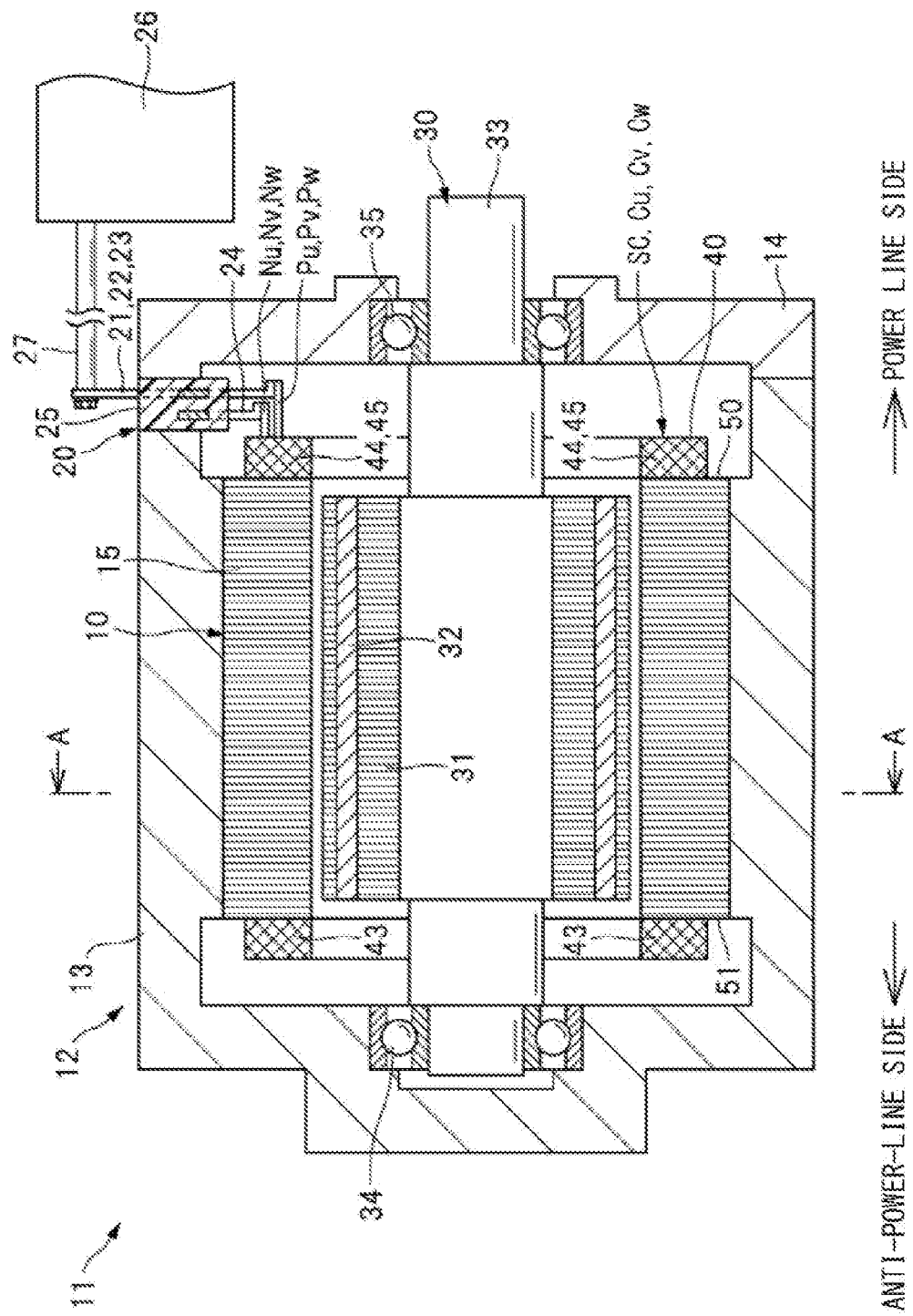
FIG. 1 is a cross-sectional view of an exemplary electric rotating machine including a stator according to one example embodiment of the technology.

FIG. 1 is a cross-sectional view of the exemplary electric rotating machine 11 including the stator 10 according to an example embodiment of the technology. As illustrated in FIG. 1, the electric rotating machine 11 serving as a motor generator may include a motor housing 12. The motor housing 12 may include a housing body 13 and an end cover 14. The housing body 13 may have a bottomed cylindrical shape. The end cover 14 may close an open end of the housing body 13. The stator 10 fixed in the housing body 13 may include a cylindrical stator core 15 and a three-phase stator coil SC. The stator core 15 may include a plurality of silicon steel plates, for example. The stator coil SC may be wound on the stator core 15. In one embodiment, the stator core 15 may serve as a "stator core".

A busbar unit 20 to be described later may be coupled to a coil end of the stator coil SC. The busbar unit 20 may include three power busbars 21 to 23, a neutral busbar 24, and an insulating member 25. The power busbars 21 to 23 are respectively coupled to three power points Pu, Pv, and Pw provided in the stator coil SC. The neutral busbar 24 couples three neutral points Nu, Nv, and Nw of the stator coil SC to each other. The insulating member 25 may integrally hold the busbars 21 to 24. Ends of the power busbars 21 to 23 may protrude outward from the motor housing 12, and a power cable 27 extending from an inverter 26, for example, may be coupled to the power busbars 21 to 23.

In the middle of the stator core 15, a columnar rotor 30 is accommodated rotatably. The rotor 30 may include a cylindrical rotor core 31, a plurality of permanent magnets 32, and a rotor shaft 33. The rotor core 31 may include a plurality of silicon steel plates, for example. The permanent magnets 32 may be provided in the rotor core 31. The rotor shaft 33 may be fixed in the middle of the rotor core 31. One end of the rotor shaft 33 may be supported by a bearing 34, and the other end of the rotor shaft 33 may be supported by a bearing 35. The bearing 34 may be provided in the housing body 13. The bearing 35 may be provided in the end cover 14.

[Structure of Stator]

Figure 2:
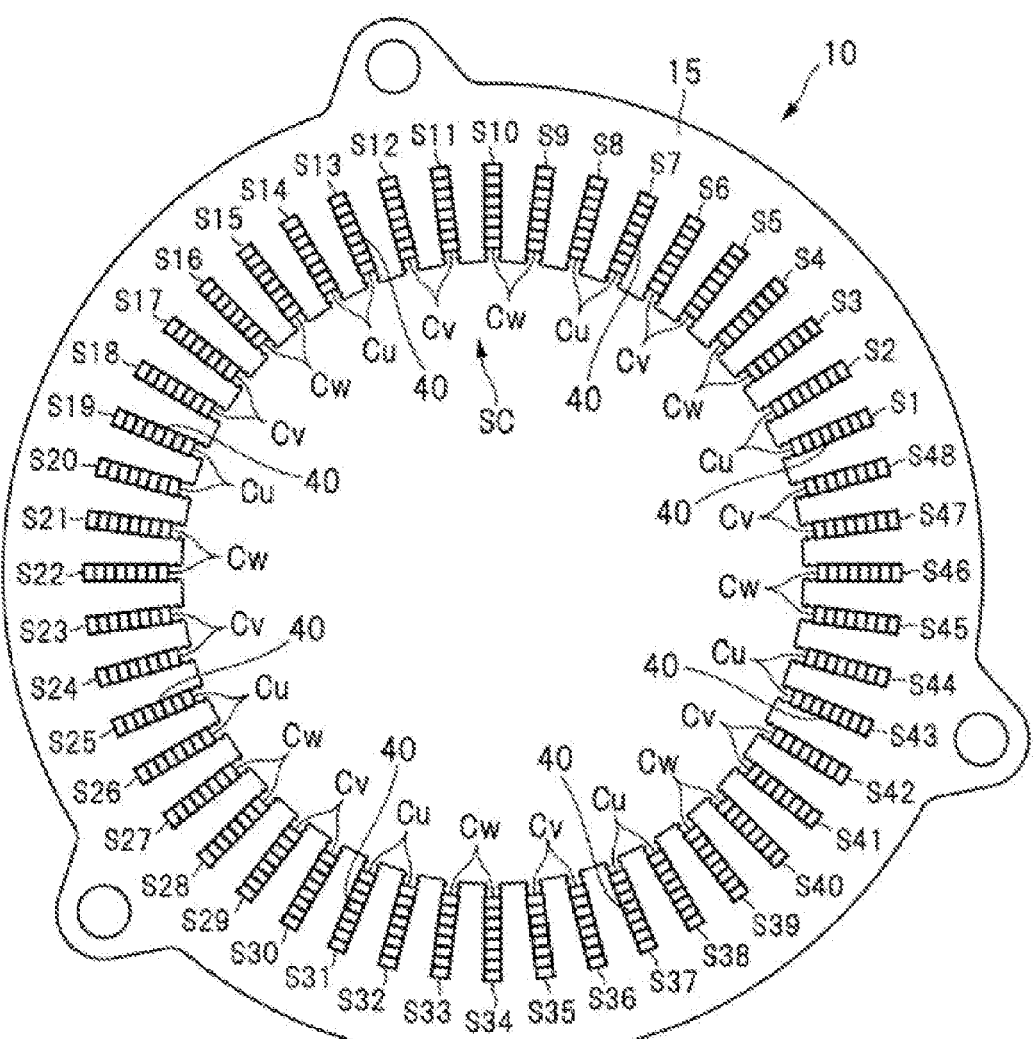
FIG. 2 is a cross-sectional view of the stator taken along line A-A in FIG. 1.
Figure 3:
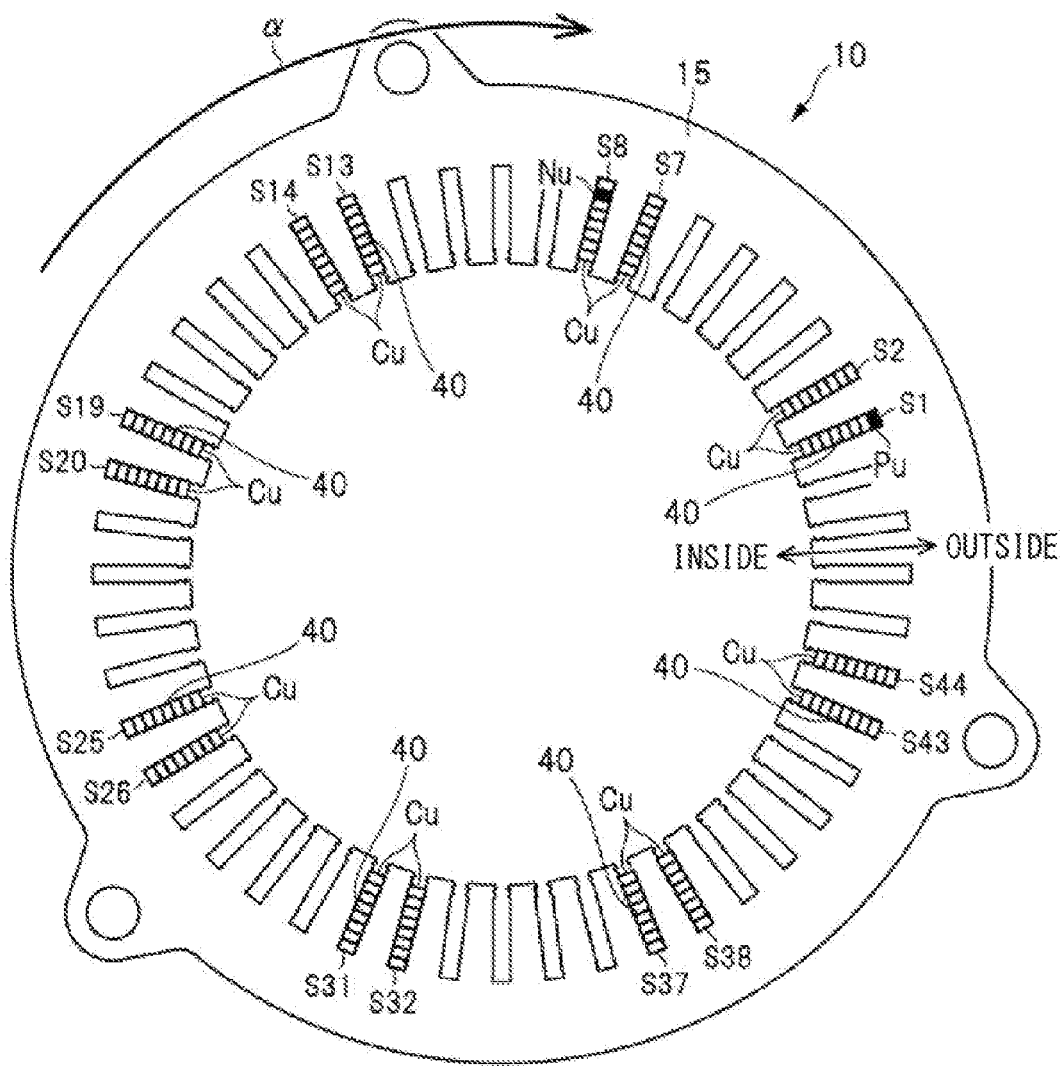
FIG. 3 is a cross-sectional view of a stator core provided with a U-phase coil.
Figure 4:
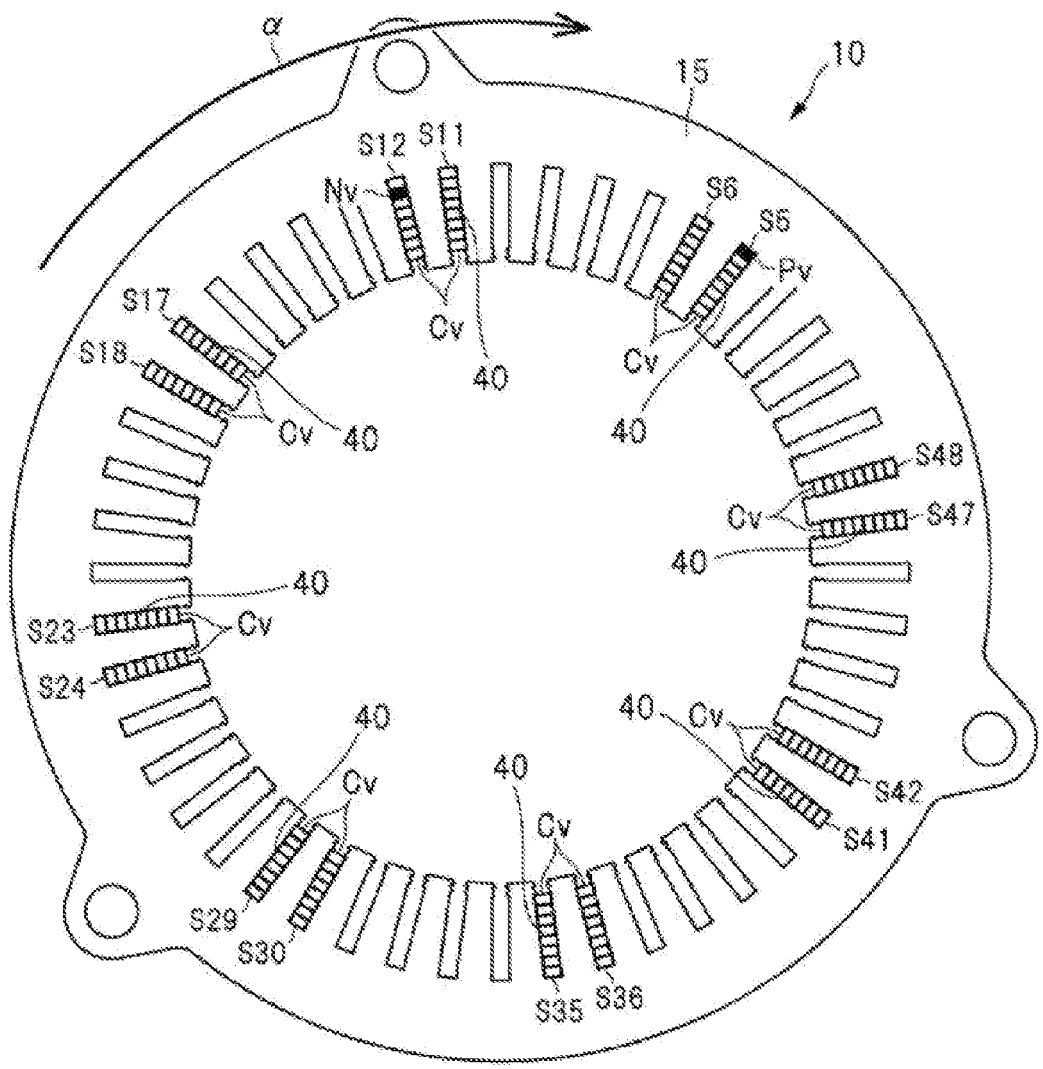
FIG. 4 is a cross-sectional view of the stator core provided with a V-phase coil.
Figure 5:
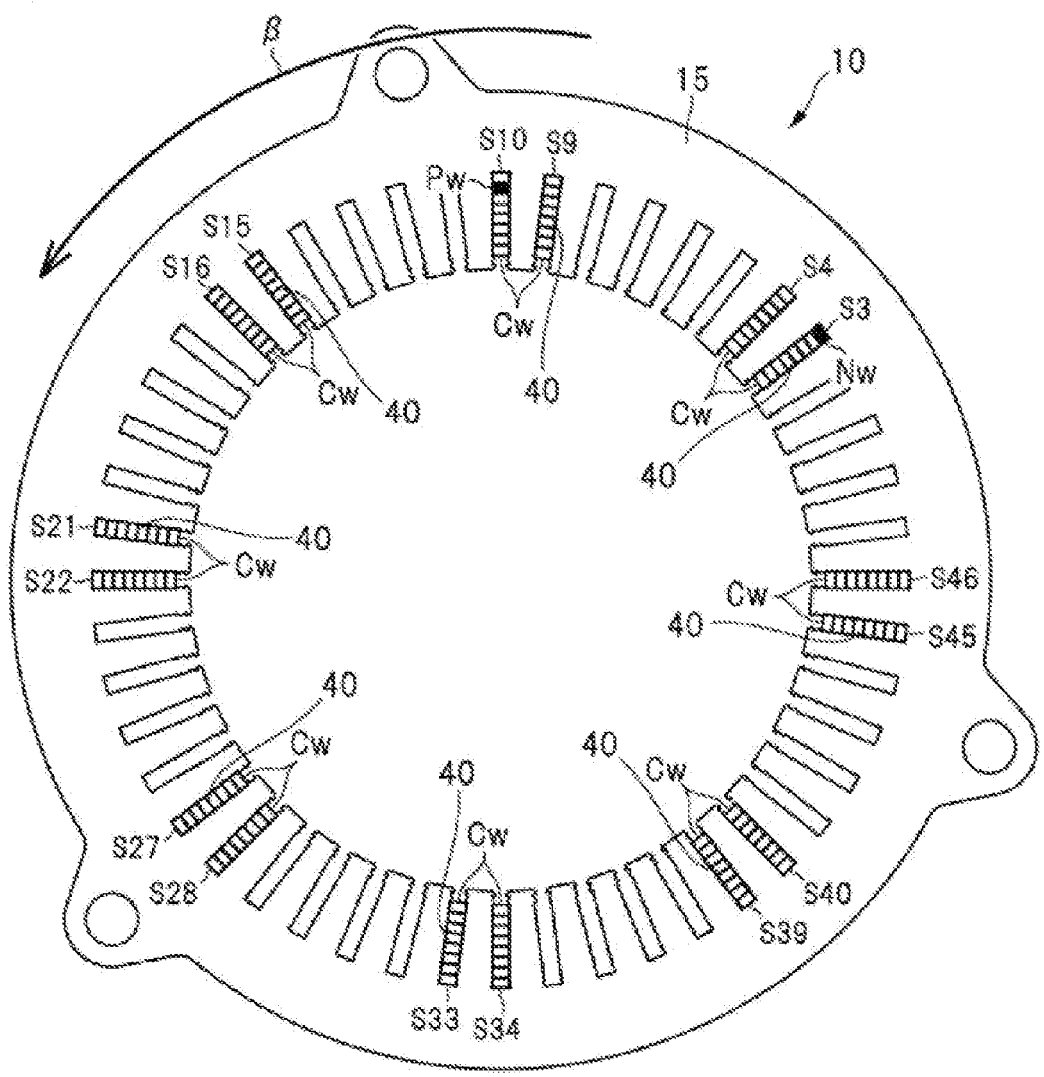
FIG. 5 is a cross-sectional view of the stator core provided with a W-phase coil.
Figure 6:
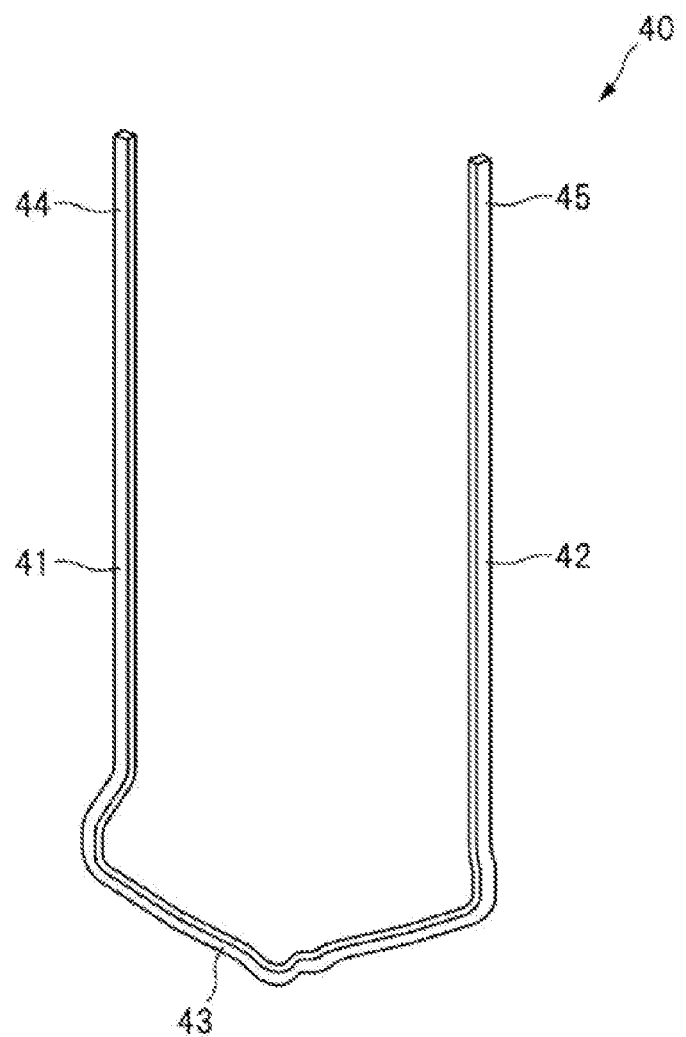
FIG. 6 is a perspective view of exemplary segment coils.

FIG. 2 is a cross-sectional view of the stator 10 taken along line A-A in FIG. 1. FIG. 3 is a cross-sectional view of the stator core 15 provided with a U-phase phase winding (hereinafter referred to as U-phase coil Cu). FIG. 4 is a cross-sectional view of the stator core 15 provided with a V-phase phase winding (hereinafter referred to as V-phase coil Cv). FIG. 5 is a cross-sectional view of the stator core 15 provided with a W-phase phase winding (hereinafter referred to as W-phase coil Cw). FIG. 6 is a perspective view of exemplary segment coils 40. It is to be noted that the U-phase coil Cu, the V-phase coil Cv, and the W-phase coil Cw may be phase windings configuring respective phases (a U phase, a V phase, and a W phase) of the stator coil SC. In one embodiment, the segment coil 40 may serve as a "segment conductor", the U-phase coil Cw may serve as a "first phase winding", the V-phase coil Cv may serve as a "second phase winding", and the W-phase coil Cw may serve as a "third phase winding".

As illustrated in FIG. 2, an inner circumference of the cylindrical stator core 15 may have a plurality of slots S1 to S48 provided at predetermined intervals in a circumferential direction. The slots S1 to S48 may accommodate the segment coils 40 to be described later, and the segment coils 40 may be coupled to each other to configure the stator coil SC. As illustrated in FIG. 3, the segment coils 40 included in the U-phase coil Cu may be accommodated in the slots S1, S2, S7, S8, etc. As illustrated in FIG. 4, the segment coils 40 included in the V-phase coil Cv may be accommodated in the slots S5, S6, S11, S12, etc. As illustrated in FIG. 5, the segment coils 40 included in the W-phase coil Cw may be accommodated in the slots S3, S4, S9, S10, etc.

As illustrated in FIG. 6, the segment coil 40 bent into a substantially U shape may have a coil side 41 to be accommodated in any slot (e.g., the slot S1) and a coil side 42 to be accommodated in another slot (e.g., the slot S7). The coil side 42 may be distanced from the coil side 41 by a predetermined coil pitch. The segment coil 40 may also have a bend 43 and welding ends 44 and 45. The bend 43 may couple the pair of coil sides 41 and 42 to each other. The welding ends 44 and 45 may extend from the pair of coil sides 41 and 42. The segment coil 40 may include rectangular wire including an electrically-conductive material such as copper. The segment coil 40, excluding tips of the welding ends 44 and 45, may be provided with enamel or an insulating film such as a resin film. The bend 43 of the segment coil 40 may have, without being limited to the bend shape illustrated in FIG. 3, any of various bend shapes depending on a position where the segment coil 40 is attached to the stator core 15.

Figure 7:
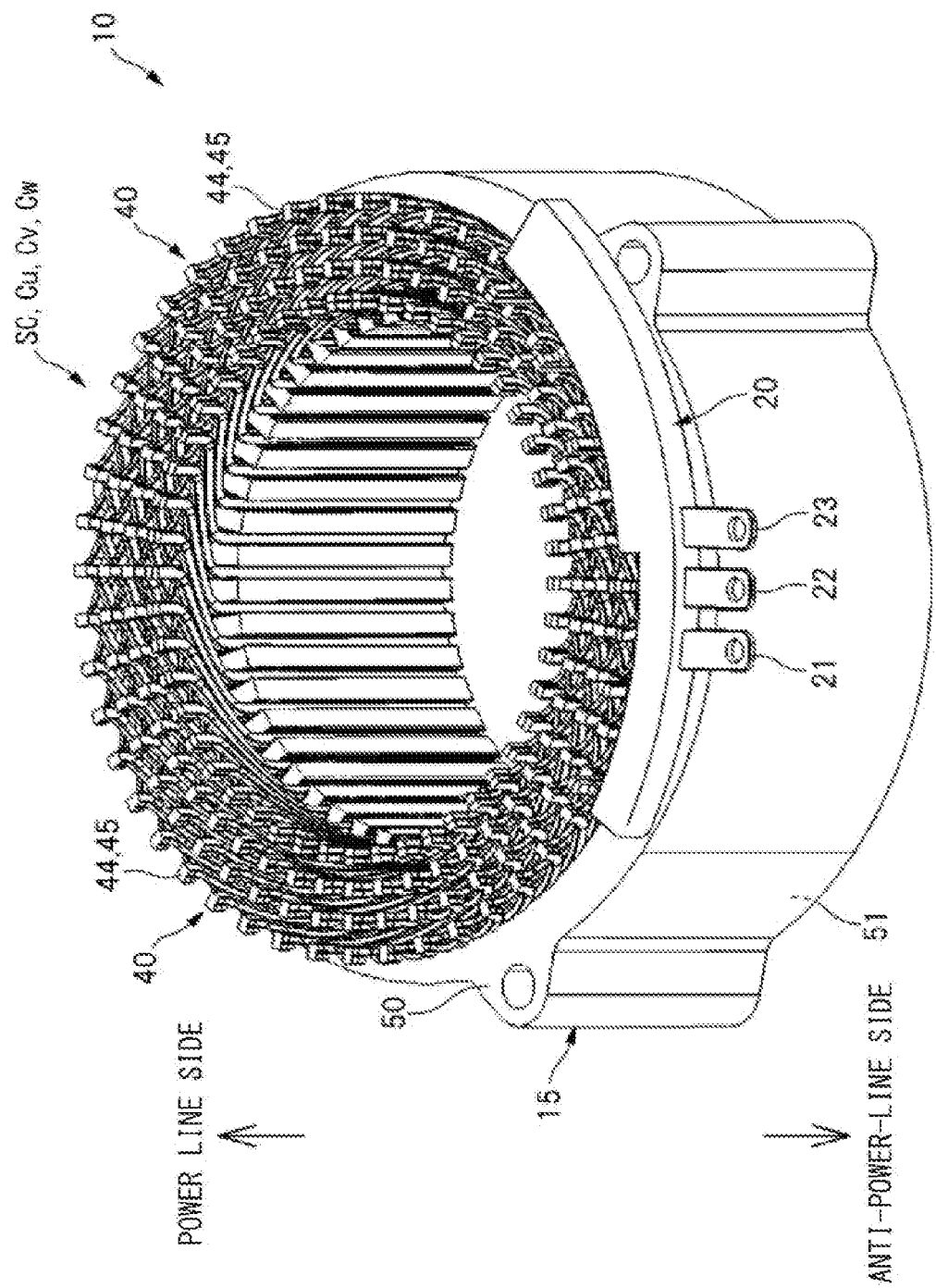
FIG. 7 is a perspective view of the stator.
Figure 8B:
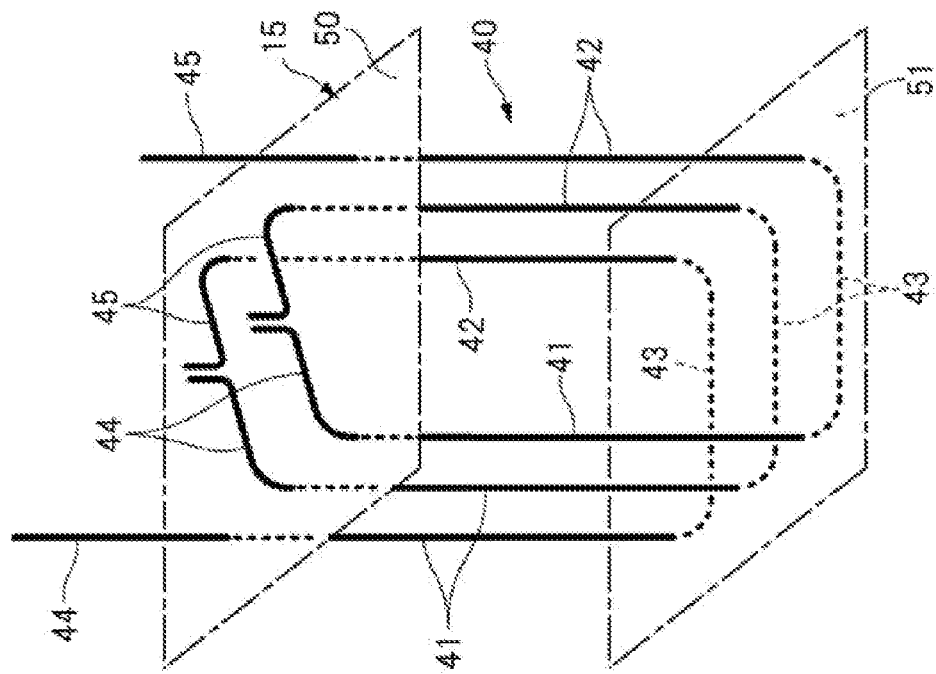
FIGS. 8A and 8B are diagrams illustrating an example of how segment coils are coupled.
Figure 8A:
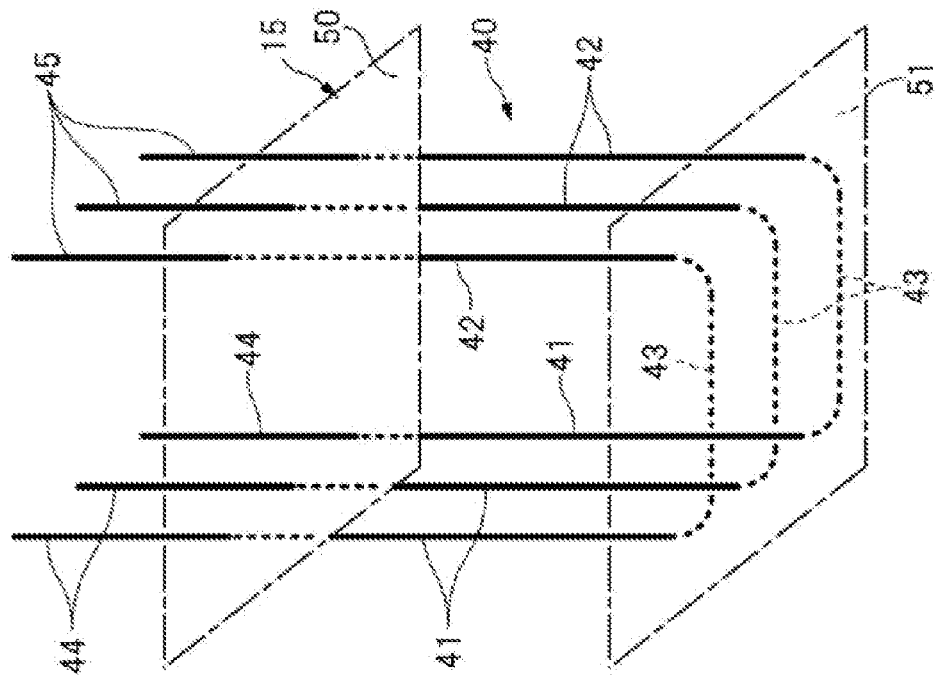

FIG. 7 is a perspective view of the stator 10. FIGS. 8A and 8B illustrate an example of how the segment coils 40 are coupled. As illustrated in FIG. 2 and FIG. 7, the segment coils 40 may be attached to the slots S1 to S48 of the stator core 15. As illustrated in FIG. 7 and FIG. 8, in a state in which the segment coils 40 are attached to the stator core 15, the welding ends 44 and 45 of the segment coil 40 may protrude from an end face 50 of the stator core 15, and the bend 43 of the segment coil 40 may protrude from an end face 51 of the stator core 15. The end face 50 may refer to one end face of the stator core 15, and the end face 51 may refer to the other end face of the stator core 15. In one embodiment, the end face 50 may serve as an "end face".

As illustrated in FIGS. 8A and 8B, the welding ends 44 and 45 protruding from the end face 50 of the stator core 15 may be bent to come into contact with the welding ends 44 and 45 of another segment coil 40. The welding ends 44 and 45 may thus be welded to the welding ends 44 and 45 of the other segment coil 40 in contact with the segment coil 40. In this manner, the segment coils 40 may be coupled to each other into one conductor configuring each of the phase coils Cu, Cv, and Cw. In other words, the segment coils 40 may configure each of the U-phase coil Cu, the V-phase coil Cv, and the W-phase coil Cw. The welding ends 44 and 45 subjected to welding may be provided with a covering of insulation. Providing a covering of insulation may refer to providing a resin film, for example, to cover a conductor.

[Structure of Stator Coil]

Figure 9:
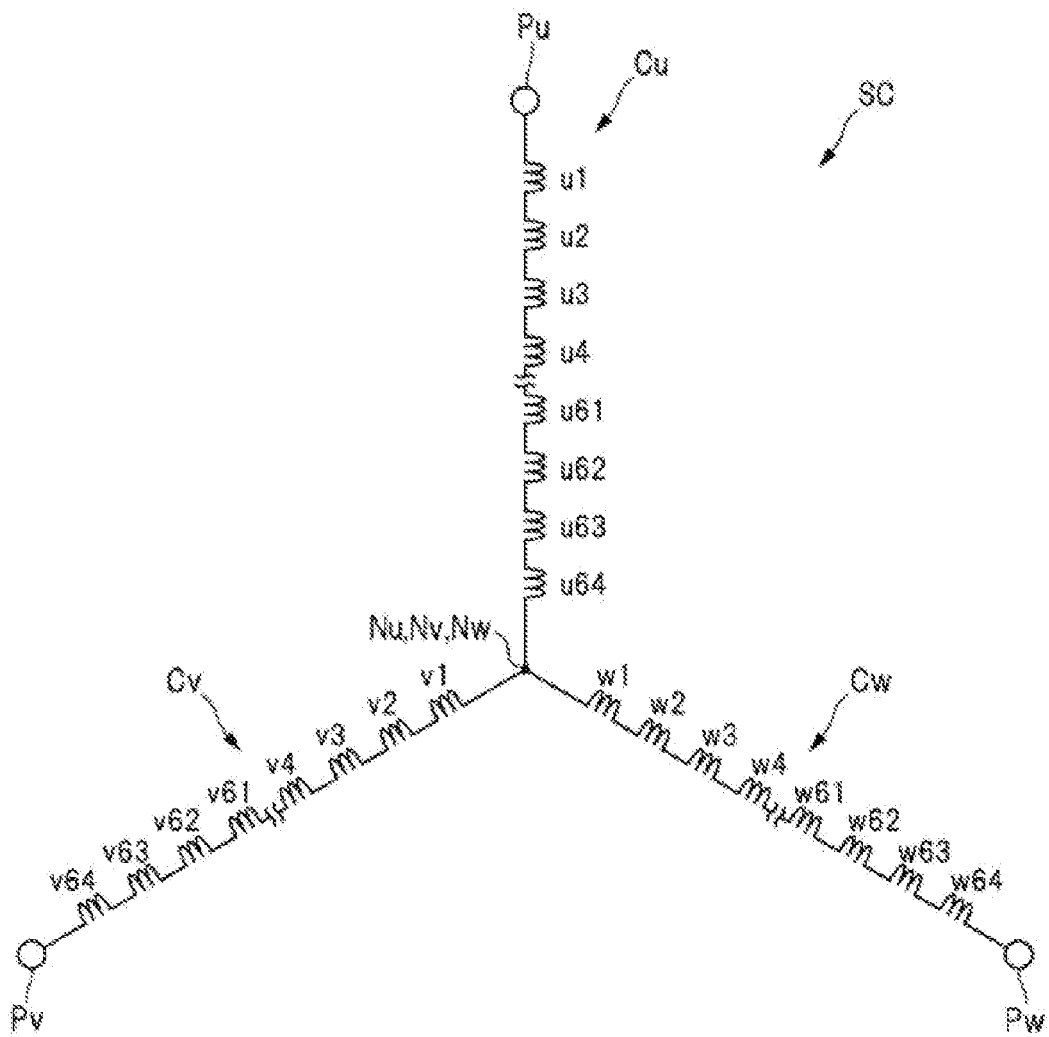
FIG. 9 is a diagram illustrating an example of a connection state of a stator coil.

FIG. 9 illustrates an example of a connection state of the stator coil SC. The above description assigns the segment coils with a numeral "40", whereas the following description assigns the segment coils with numerals "u1 to u64, v1 to v64, and w1 to w64" in terms of distinguishing between the individual segment coils.

As illustrated in FIG. 9, the stator coil SC may include the U-phase coil Cu, the V-phase coil Cv, and the W-phase coil Cw. The U-phase coil Cu may include the segment coils u1 to u64 coupled to each other in series. One end of the U-phase coil Cu serves as the power point Pu, and the other end of the U-phase coil Cu serves as the neutral point Nu. The V-phase coil Cv may include the segment coils v1 to v64 coupled to each other in series. One end of the V-phase coil Cv serves as the power point Pv, and the other end of the V-phase coil Cv serves as the neutral point Nv. The W-phase coil Cw may include the segment coils w1 to w64 coupled to each other in series. One end of the W-phase coil Cw serves as the power point Pw, and the other end of the W-phase coil Cw serves as the neutral point Nw. The neutral point Nu of the U-phase coil Cu, the neutral point Nv of the V-phase coil Cv, and the neutral point Nw of the W-phase coil Cw are coupled to each other, and the phase coils Cu, Cv, and Cw may configure the stator coil SC.

[Structure of U-Phase Coil]

Figure 10:
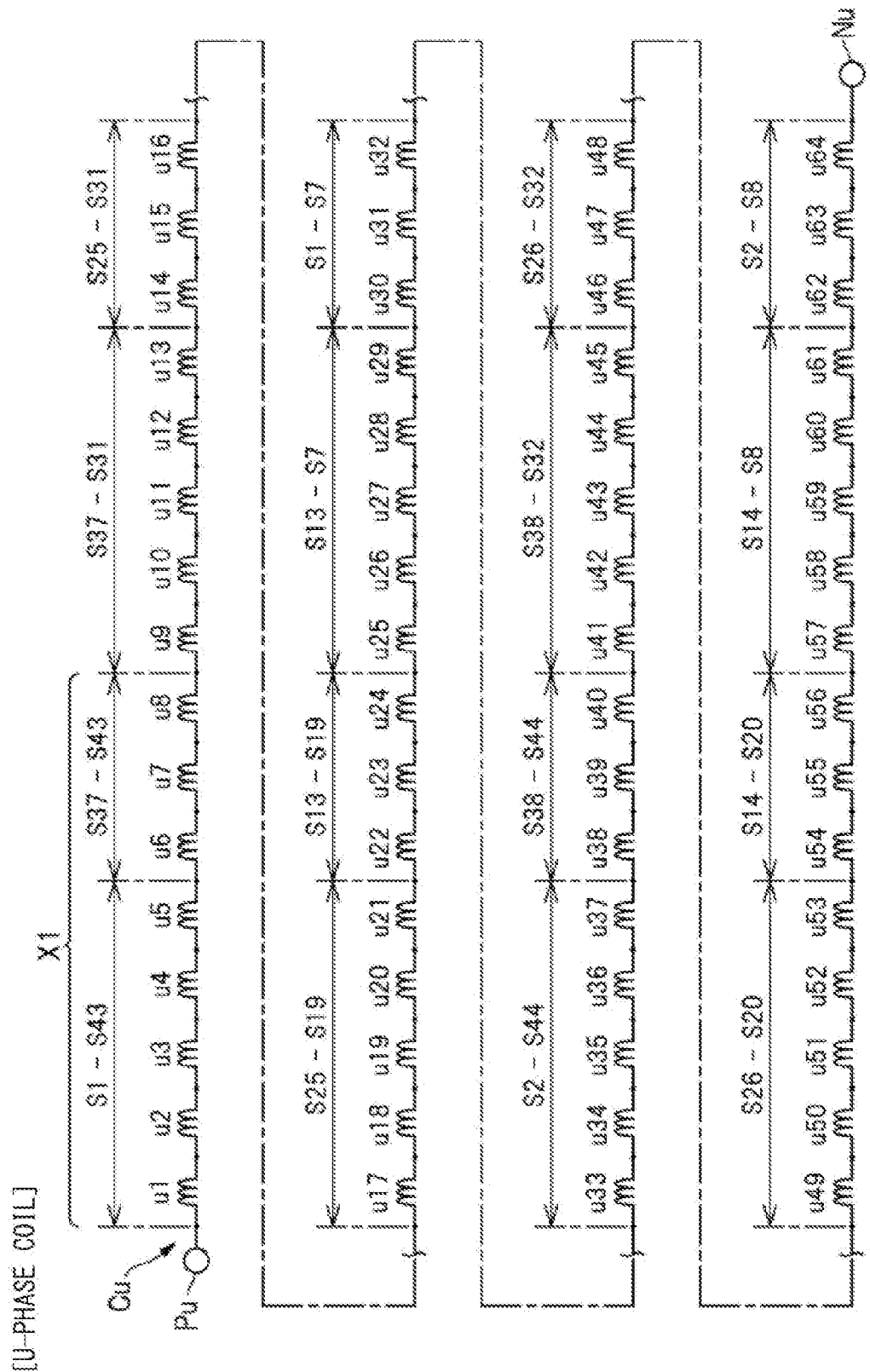
FIG. 10 is a diagram illustrating an example of a coil structure of the U-phase coil.
Figure 11:
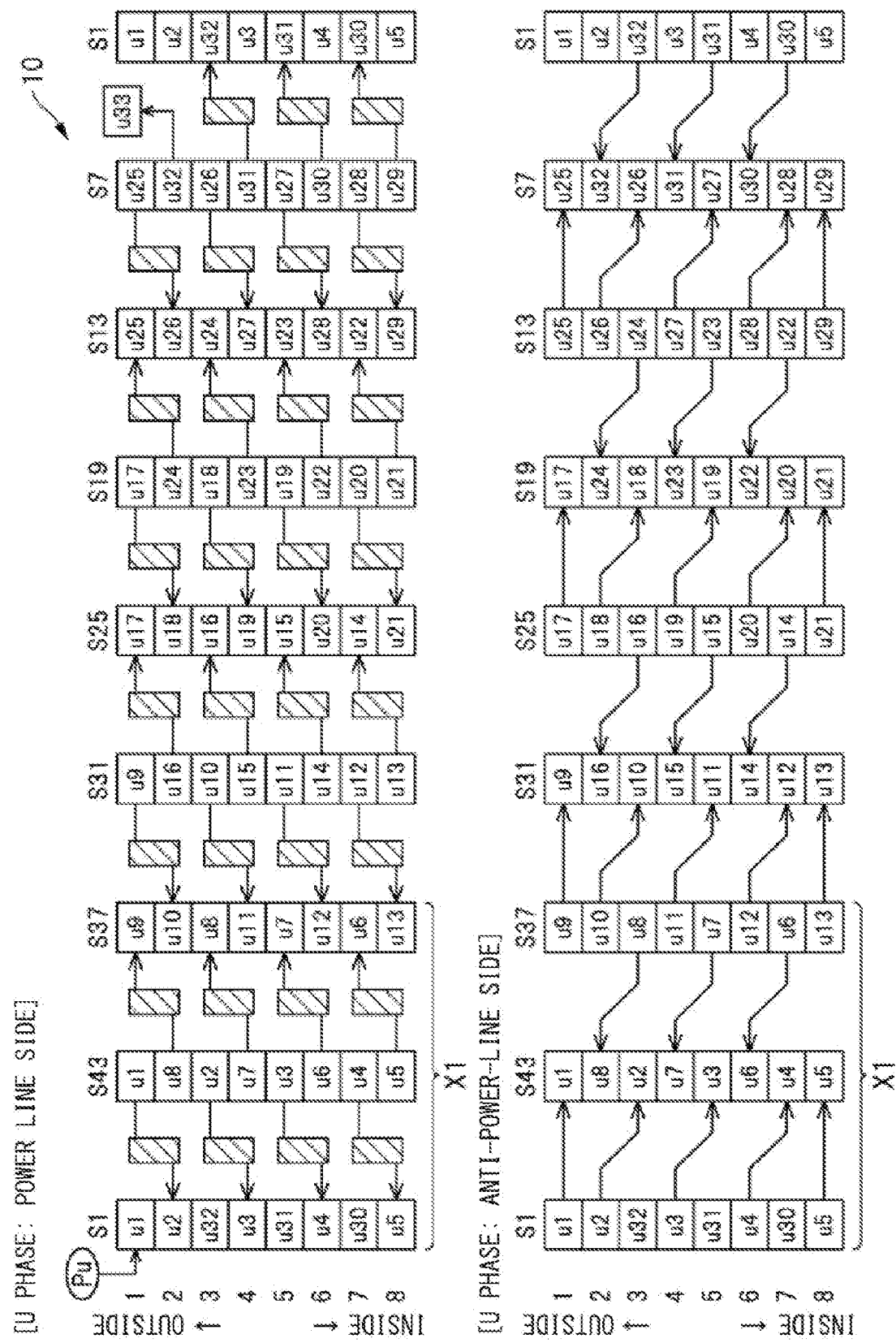
FIG. 11 is a diagram illustrating positions where segment coils included in the U-phase coil are accommodated in slots.
Figure 12:
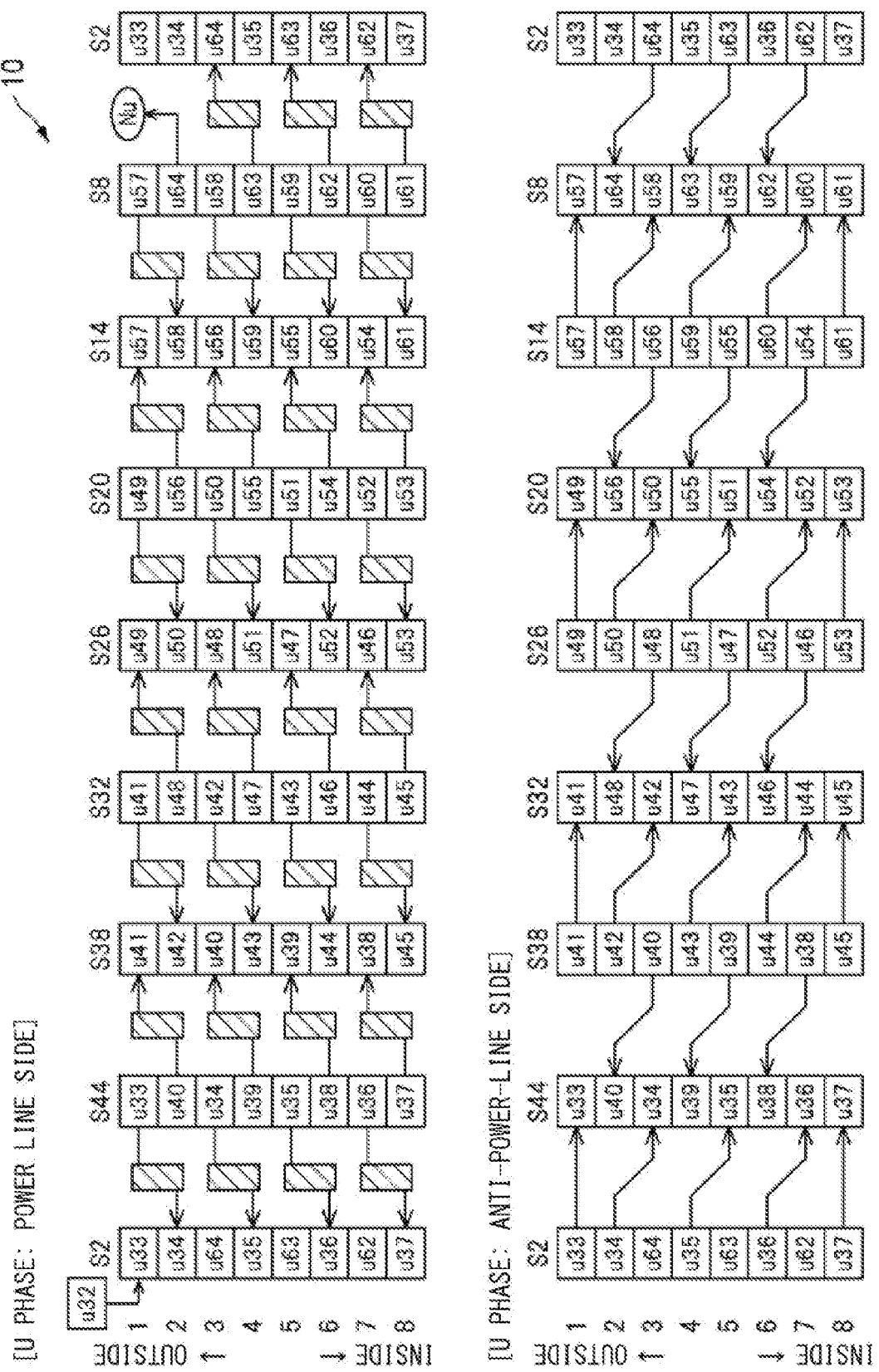
FIG. 12 is a diagram illustrating positions where segment coils included in the U-phase coil are accommodated in slots.

A structure of the U-phase coil Cu will be described in detail. FIG. 10 illustrates an example of the coil structure of the U-phase coil Cu. Slot numbers illustrated in FIG. 10 indicate the slots that accommodate the segment coils u1 to u64. FIG. 11 and FIG. 12 illustrate positions where the segment coils u1 to u64 included in the U-phase coil Cu are accommodated in the slots S1, S2, S7, S8, etc. FIG. 11 illustrates positions where the segment coils u1 to u32 are accommodated, and FIG. 12 illustrates positions where the segment coils u33 to u64 are accommodated.

The "power line side" illustrated in FIG. 11 and FIG. 12 may refer to, as illustrated in FIG. 1 and FIG. 7, a side on which the welding ends 44 and 45 of the segment coil 40 are positioned, i.e., a side on which the busbar unit 20 is positioned. The "anti-power-line side" illustrated in FIG. 11 and FIG. 12 may refer to, as illustrated in FIG. 1 and FIG. 7, a side opposite to the power line side, i.e., a side on which the bend 43 of the segment coil 40 is positioned. The "inside" illustrated in FIG. 11 and FIG. 12 may refer to, as illustrated in FIG. 3, the inside of the stator core 15 in a radial direction, and the "outside" illustrated in FIG. 11 and FIG. 12 may refer to the outside of the stator core 15 in the radial direction. Hatched portions in FIG. 11 and FIG. 12 may indicate welds of the segment coils u1 to u64.

As illustrated in FIG. 10, the U-phase coil Cu may have a coil structure in which a connection pattern of eight segment coils (e.g., u1 to u8, u9 to u16, u17 to u24, etc.) is repeated. Description will be given on the connection pattern of the segment coils u1 to u8 indicated by a numeral X1 in FIG. 10.

As indicated by the numeral X1 in FIG. 11, the segment coil u1 may be accommodated in first positions (outside positions) of the slots S1 and S43, and the segment coil u2 may be accommodated in a second position of the slot S1 and a third position of the slot S43. The segment coil u3 may be accommodated in a fourth position of the slot S1 and a fifth position of the slot S43, the segment coil u4 may be accommodated in a sixth position of the slot S1 and a seventh position of the slot S43, and the segment coil u5 may be accommodated in eighth positions of the slots S1 and S43. The segment coil u6 may be accommodated in the seventh position of the slot S37 and the sixth position of the slot S43, the segment coil u7 may be accommodated in the fifth position of the slot S37 and the fourth position of the slot S43, and the segment coil u8 may be accommodated in the third position of the slot S37 and the second position of the slot S43.

Between the slots S1 and S43 on the power line side, the segment coil u1 extending from the slot S43 and the segment coil u2 extending from the slot S1 may be welded to each other, and the segment coil u2 extending from the slot S43 and the segment coil u3 extending from the slot S1 may be welded to each other. In addition, the segment coil u3 extending from the slot S43 and the segment coil u4 extending from the slot S1 may be welded to each other, and the segment coil u4 extending from the slot S43 and the segment coil u5 extending from the slot S1 may be welded to each other. Between the slots S37 and S43 on the power line side, the segment coil u5 extending from the slot S43 and the segment coil u6 extending from the slot S37 may be welded to each other, the segment coil u6 extending from the slot S43 and the segment coil u7 extending from the slot S37 may be welded to each other, and the segment coil u7 extending from the slot S43 and the segment coil u8 extending from the slot S37 may be welded to each other.

Such a connection pattern may be repeated to couple the segment coils u1 to u64. Thus, as illustrated in FIG. 10 to FIG. 12, the segment coils u1 to u64 may configure the U-phase coil Cu. The U-phase coil Cu thus configured may, as illustrated in FIG. 10, start to be wound from between the slots S1 and S43, and may then be wound between slots such as the slots S25 and S19 to reach between the slots S7 and S1. Thereafter, the U-phase coil Cu may be wound between the slots S2 and S44, then between slots such as the slots S26 and S20 to reach between the slots S8 and S2. In other words, as illustrated in FIG. 3, the U-phase coil Cu may be wound on the stator core 15 for two laps, while progressing in one of circumferential directions of the stator core 15 (arrow a direction), from the power point Pu toward the neutral point Nu. As illustrated in FIG. 3, FIG. 11, and FIG. 12, the power point Pu of the U-phase coil Cu may extend from the first position of the slot S1, and the neutral point Nu of the U-phase coil Cu may extend from the second position of the slot S8.

[Structure of V-Phase Coil]

Figure 13:
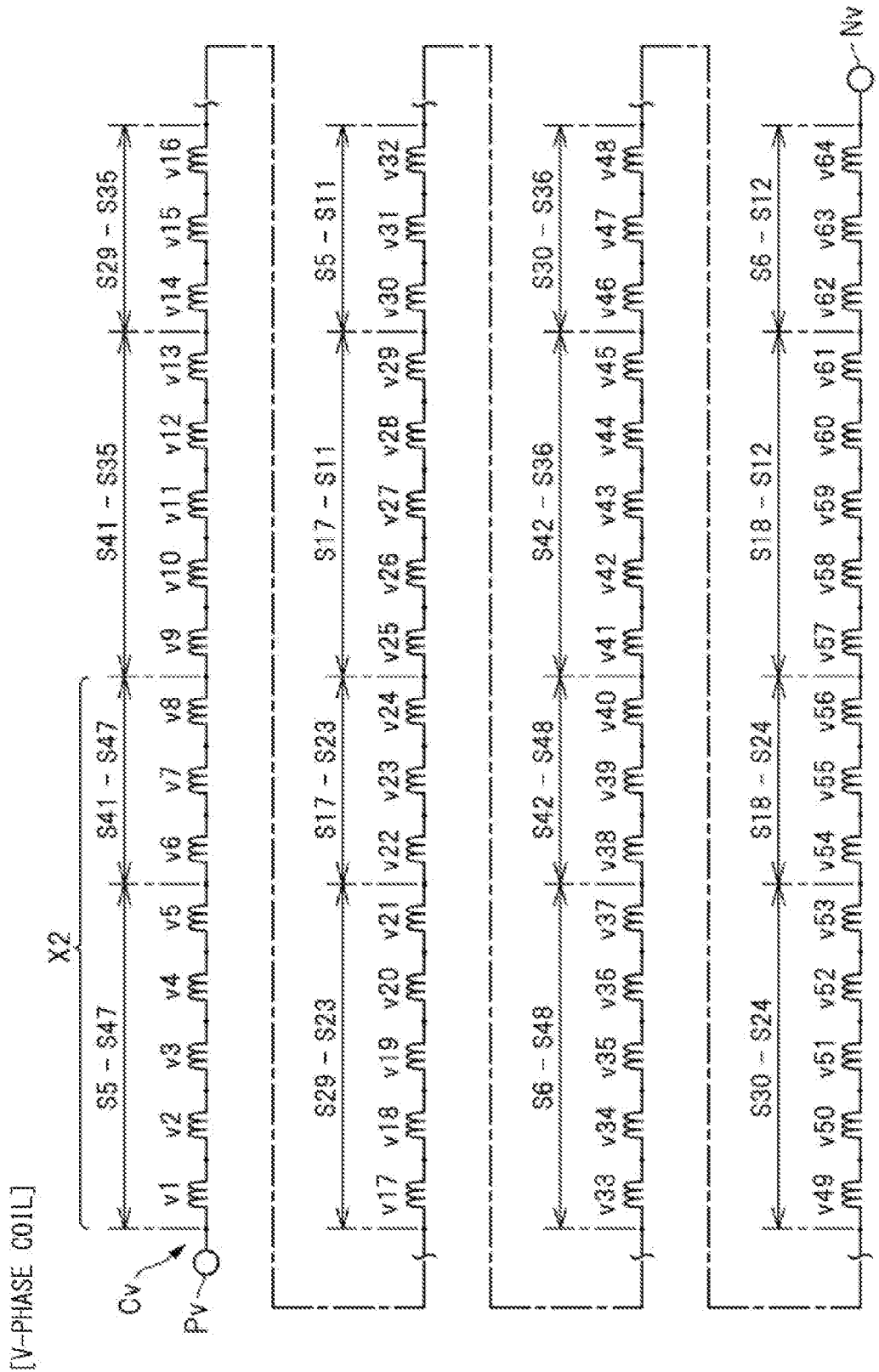
FIG. 13 is a diagram illustrating an example of a coil structure of the V-phase coil.
Figure 14:
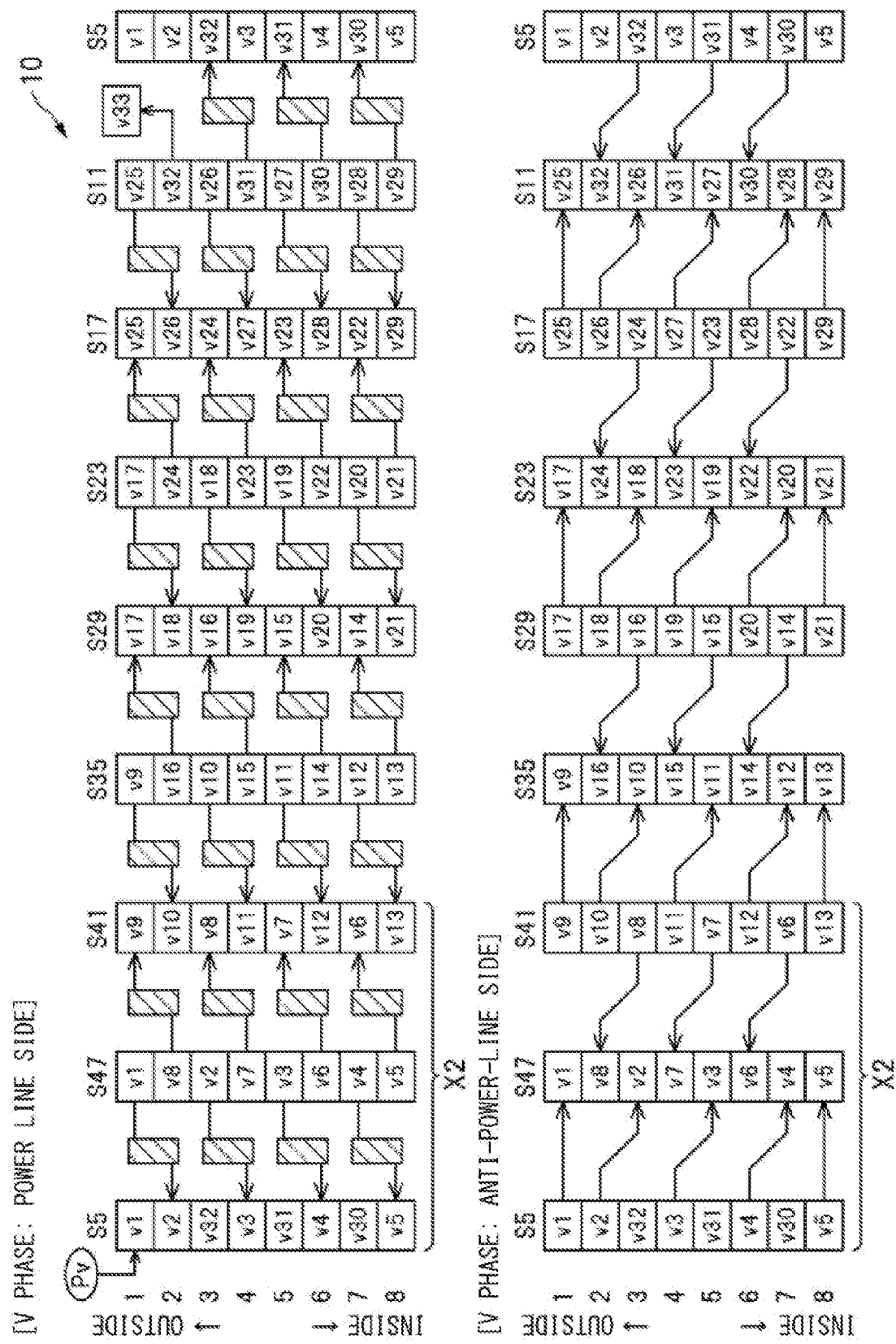
FIG. 14 is a diagram illustrating positions where segment coils included in the V-phase coil are accommodated in slots.
Figure 15:
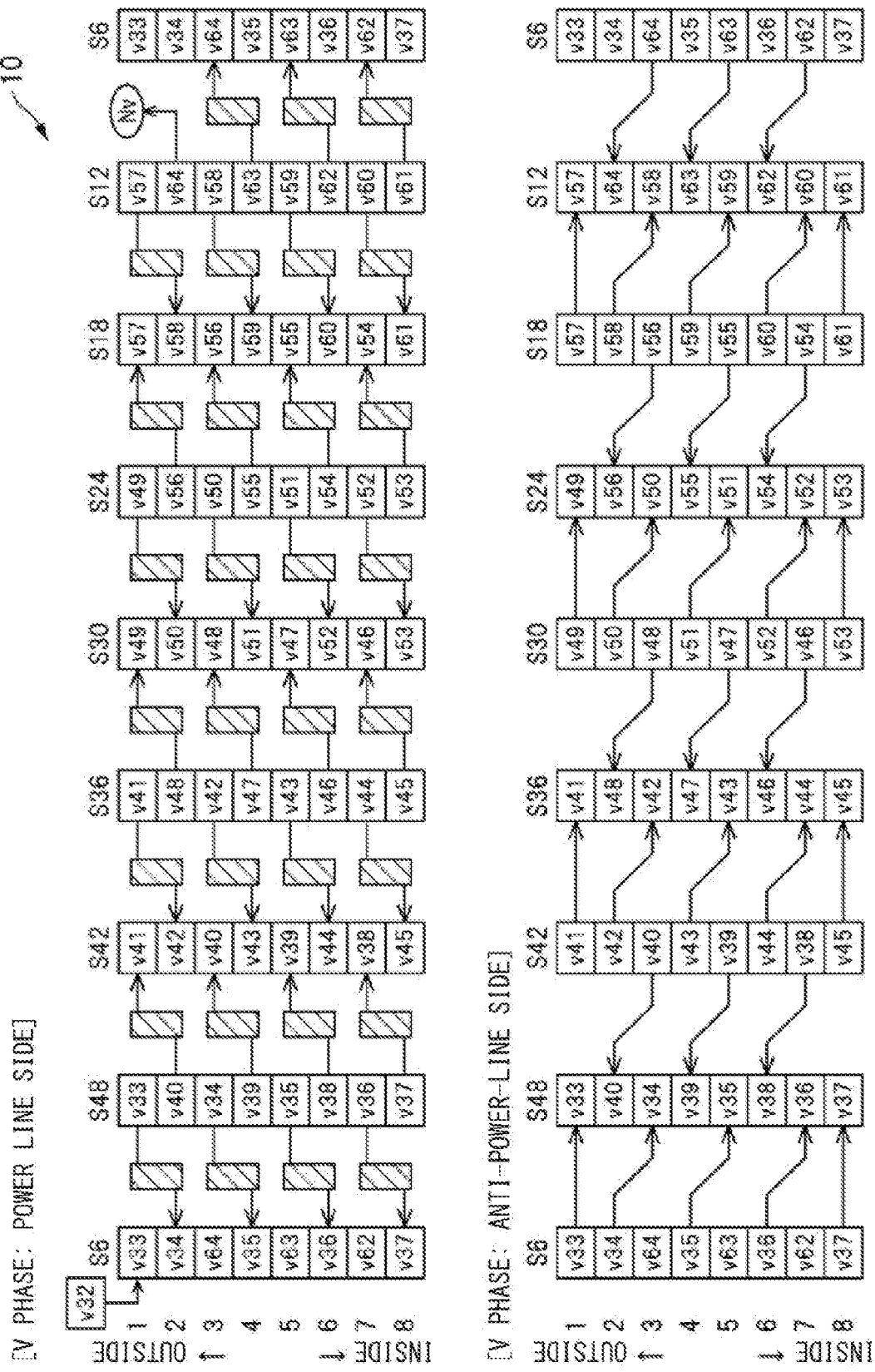
FIG. 15 is a diagram illustrating positions where segment coils included in the V-phase coil are accommodated in slots.

A structure of the V-phase coil Cv will be described in detail. FIG. 13 illustrates an example of the coil structure of the V-phase coil Cv. Slot numbers illustrated in FIG. 13 indicate the slots that accommodate the segment coils v1 to v64. FIG. 14 and FIG. 15 illustrate positions where the segment coils v1 to v64 included in the V-phase coil Cv are accommodated in the slots S5, S6, S11, S12, etc. FIG. 14 illustrates positions where the segment coils v1 to v32 are accommodated, and FIG. 15 illustrates positions where the segment coils v33 to v64 are accommodated.

The "power line side" illustrated in FIG. 14 and FIG. 15 may refer to, as illustrated in FIG. 1 and FIG. 7, the side on which the welding ends 44 and 45 of the segment coil 40 are positioned, i.e., the side on which the busbar unit 20 is positioned. The "anti-power-line side" illustrated in FIG. 14 and FIG. 15 may refer to, as illustrated in FIG. 1 and FIG. 7, the side opposite to the power line side, i.e., the side on which the bend 43 of the segment coil 40 is positioned. The "inside" illustrated in FIG. 14 and FIG. 15 may refer to, as illustrated in FIG. 3, the inside of the stator core 15 in the radial direction, and the "outside" illustrated in FIG. 14 and FIG. 15 may refer to the outside of the stator core 15 in the radial direction. Hatched portions in FIG. 14 and FIG. 15 may indicate welds of the segment coils v1 to v64.

As illustrated in FIG. 13, the V-phase coil Cv may have a coil structure in which a connection pattern of eight segment coils (e.g., v1 to v8, v9 to v16, v17 to v24, etc.) is repeated. Description will be given on the connection pattern of the segment coils v1 to v8 indicated by a numeral X2 in FIG. 13.

As indicated by the numeral X2 in FIG. 14, the segment coil v1 may be accommodated in the first positions of the slots S5 and S47, and the segment coil v2 may be accommodated in the second position of the slot S5 and the third position of the slot S47. The segment coil v3 may be accommodated in the fourth position of the slot S5 and the fifth position of the slot S47, the segment coil v4 may be accommodated in the sixth position of the slot S5 and the seventh position of the slot S47, and the segment coil v5 may be accommodated in the eighth positions of the slots S5 and S47. The segment coil v6 may be accommodated in the seventh position of the slot S41 and the sixth position of the slot S47, the segment coil v7 may be accommodated in the fifth position of the slot S41 and the fourth position of the slot S47, and the segment coil v8 may be accommodated in the third position of the slot S41 and the second position of the slot S47.

Between the slots S5 and S47 on the power line side, the segment coil v1 extending from the slot S47 and the segment coil v2 extending from the slot S5 may be welded to each other, and the segment coil v2 extending from the slot S47 and the segment coil v3 extending from the slot S5 may be welded to each other. In addition, the segment coil v3 extending from the slot S47 and the segment coil v4 extending from the slot S5 may be welded to each other, and the segment coil v4 extending from the slot S47 and the segment coil v5 extending from the slot S5 may be welded to each other. Between the slots S41 and S47 on the power line side, the segment coil v5 extending from the slot S47 and the segment coil v6 extending from the slot S41 may be welded to each other, the segment coil v6 extending from the slot S47 and the segment coil v7 extending from the slot S41 may be welded to each other, and the segment coil v7 extending from the slot S47 and the segment coil v8 extending from the slot S41 may be welded to each other.

Such a connection pattern may be repeated to couple the segment coils v1 to v64. Thus, as illustrated in FIG. 13 to FIG. 15, the segment coils v1 to v64 may configure the V-phase coil Cv. The V-phase coil Cv thus configured may, as illustrated in FIG. 13, start to be wound from between the slots S5 and S47, and may then be wound between slots such as the slots S29 and S23 to reach between the slots S11 and S5. Thereafter, the V-phase coil Cv may be wound between the slots S6 and S48, then between slots such as the slots S30 and S24 to reach between the slots S12 and S6. In other words, as illustrated in FIG. 4, the V-phase coil Cv may be wound on the stator core 15 for two laps, while progressing in one of the circumferential directions of the stator core 15 (arrow α direction), from the power point Pv toward the neutral point Nv. As illustrated in FIG. 4, FIG. 14, and FIG. 15, the power point Pv of the V-phase coil Cv may extend from the first position of the slot S5, and the neutral point Nv of the V-phase coil Cv may extend from the second position of the slot S12.

[Structure of W-Phase Coil]

Figure 16:
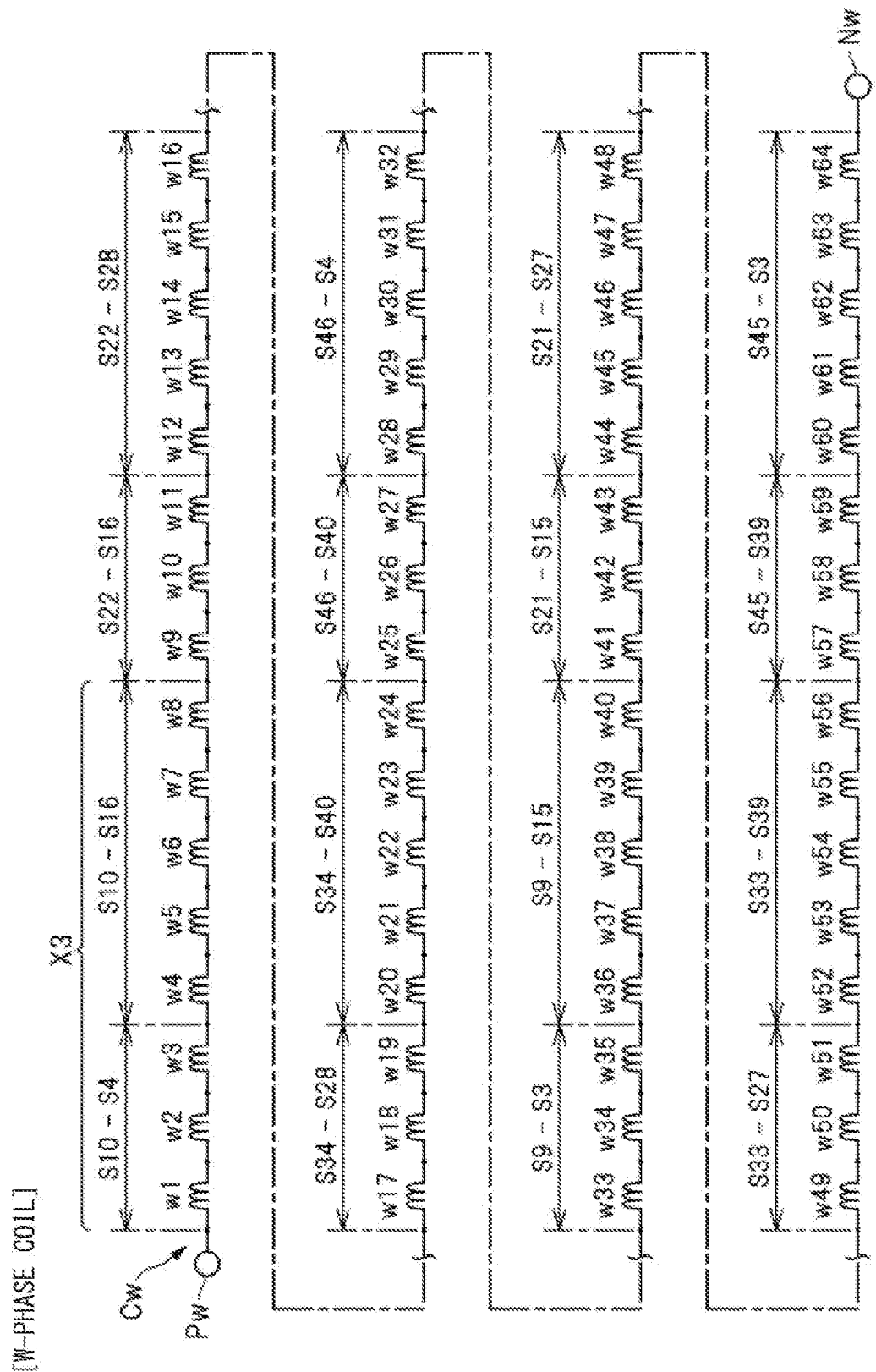
FIG. 16 is a diagram illustrating an example of a coil structure of the W-phase coil.
Figure 17:
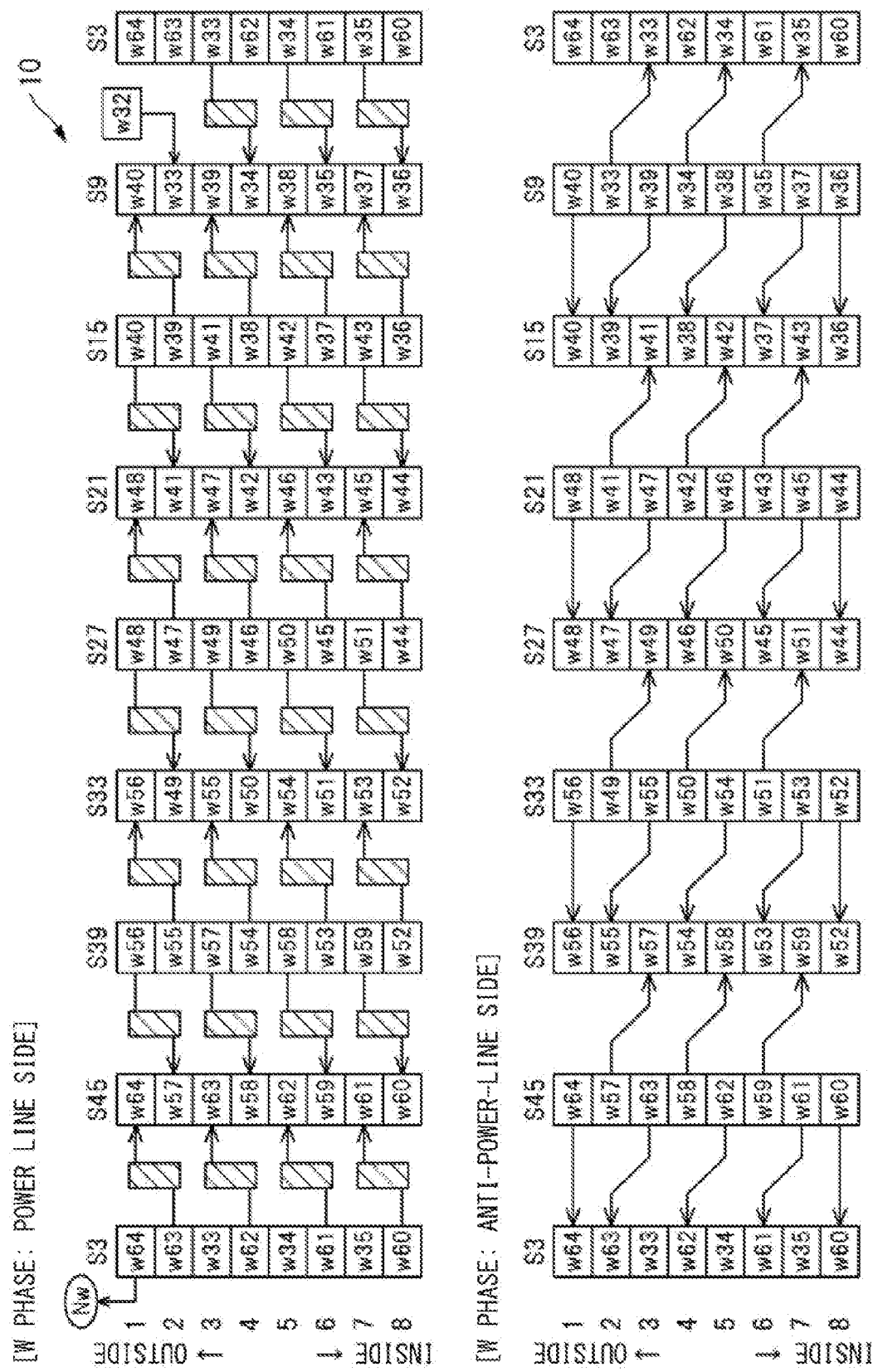
FIG. 17 is a diagram illustrating positions where segment coils included in the W-phase coil are accommodated in slots.
Figure 18:
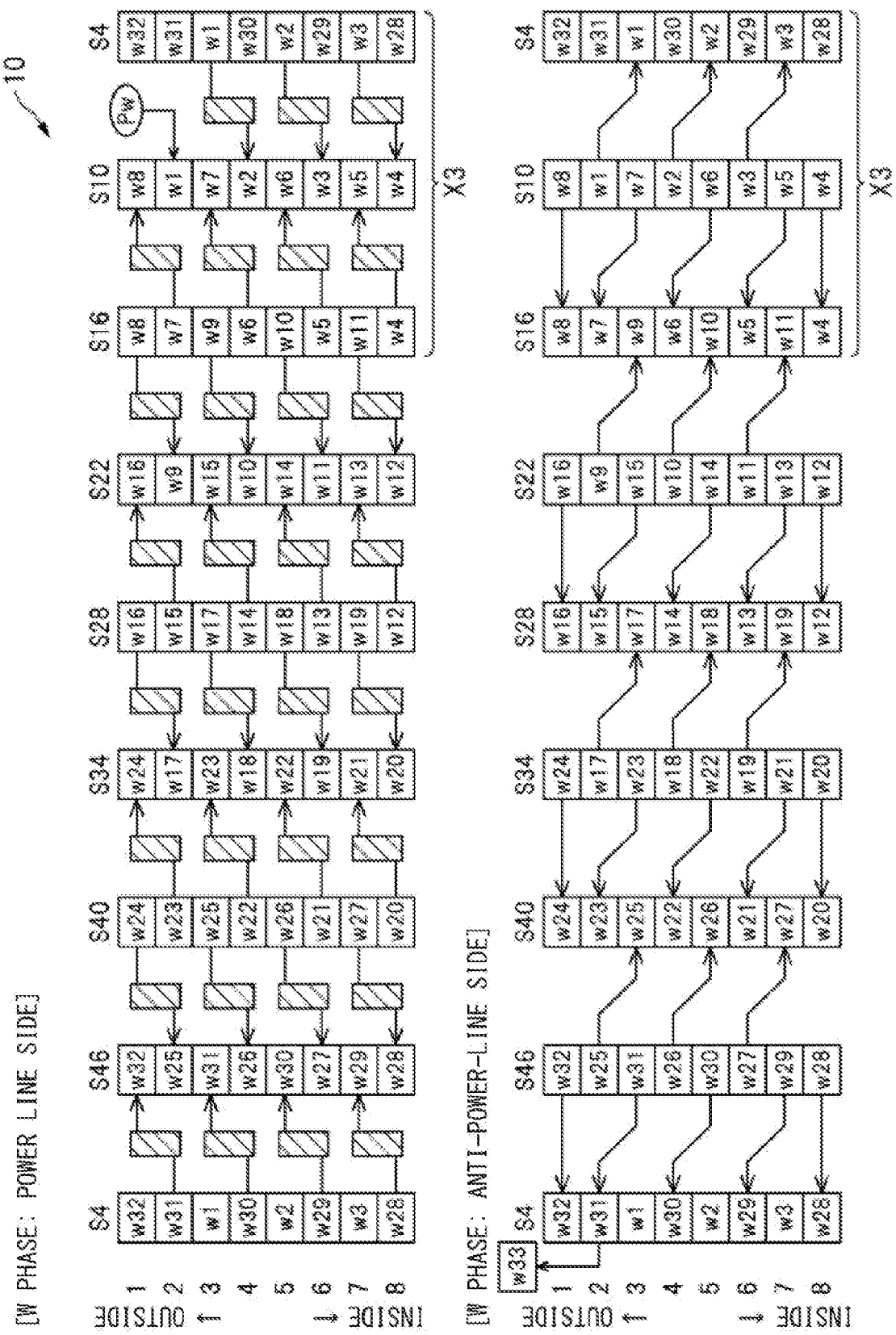
FIG. 18 is a diagram illustrating positions where segment coils included in the W-phase coil are accommodated in slots.

A structure of the W-phase coil Cw will be described in detail. FIG. 16 illustrates an example of the coil structure of the W-phase coil Cw. Slot numbers illustrated in FIG. 16 indicate the slots that accommodate the segment coils w1 to w64. FIG. 17 and FIG. 18 illustrate positions where the segment coils w1 to w64 included in the W-phase coil Cw are accommodated in the slots S3, S4, S9, S10, etc. FIG. 17 illustrates positions where the segment coils w33 to w64 are accommodated, and FIG. 18 illustrates positions where the segment coils w1 to w32 are accommodated.

The "power line side" illustrated in FIG. 17 and FIG. 18 may refer to, as illustrated in FIG. 1 and FIG. 7, the side on which the welding ends 44 and 45 of the segment coil 40 are positioned, i.e., the side on which the busbar unit 20 is positioned. The "anti-power-line side" illustrated in FIG. 17 and FIG. 18 may refer to, as illustrated in FIG. 1 and FIG. 7, the side opposite to the power line side, i.e., the side on which the bend 43 of the segment coil 40 is positioned. The "inside" illustrated in FIG. 17 and FIG. 18 may refer to, as illustrated in FIG. 3, the inside of the stator core 15 in the radial direction, and the "outside" illustrated in FIG. 17 and FIG. 18 may refer to the outside of the stator core 15 in the radial direction. Hatched portions in FIG. 17 and FIG. 18 may indicate welds of the segment coils w1 to w64.

As illustrated in FIG. 16, the W-phase coil Cw may have a coil structure in which a connection pattern of eight segment coils (e.g., w1 to w8, w9 to w16, w17 to w24, etc.) is repeated. Description will be given on the connection pattern of the segment coils w1 to w8 indicated by a numeral X3 in FIG. 16.

As indicated by the numeral X3 in FIG. 18, the segment coil w1 may be accommodated in the second position of the slot S10 and the third position of the slot S4, the segment coil w2 may be accommodated in the fourth position of the slot S10 and the fifth position of the slot S4, and the segment coil w3 may be accommodated in the sixth position of the slot S10 and the seventh position of the slot S4. The segment coil w4 may be accommodated in the eighth positions of the slots S10 and S16, and the segment coil w5 may be accommodated in the seventh position of the slot S10 and the sixth position of the slot S16. The segment coil w6 may be accommodated in the fifth position of the slot S10 and the fourth position of the slot S16, the segment coil w7 may be accommodated in the third position of the slot S10 and the second position of the slot S16, and the segment coil w8 may be accommodated in the first positions of the slots S10 and S16.

Between the slots S4 and S10 on the power line side, the segment coil w1 extending from the slot S4 and the segment coil w2 extending from the slot S10 may be welded to each other, the segment coil w2 extending from the slot S4 and the segment coil w3 extending from the slot S10 may be welded to each other, and the segment coil w3 extending from the slot S4 and the segment coil w4 extending from the slot S10 may be welded to each other. Between the slots S16 and S10 on the power line side, the segment coil w4 extending from the slot S16 and the segment coil w5 extending from the slot S10 may be welded to each other, and the segment coil w5 extending from the slot S16 and the segment coil w6 extending from the slot S10 may be welded to each other. In addition, the segment coil w6 extending from the slot S16 and the segment coil w7 extending from the slot S10 may be welded to each other, and the segment coil w7 extending from the slot S16 and the segment coil w8 extending from the slot S10 may be welded to each other.

Such a connection pattern may be repeated to couple the segment coils w1 to w64. Thus, as illustrated in FIG. 16 to FIG. 18, the segment coils w1 to w64 may configure the W-phase coil Cw. The W-phase coil Cw thus configured may, as illustrated in FIG. 16, start to be wound from between the slots S4 and S10, and may then be wound between slots such as the slots S28 and S34 to reach between the slots S46 and S4. Thereafter, the W-phase coil Cw may be wound between the slots S3 and S9, then between slots such as the slots S27 and S33 to reach between the slots S45 and S3. In other words, as illustrated in FIG. 5, the W-phase coil Cw may be wound on the stator core 15 for two laps, while progressing in the other of the circumferential directions of the stator core 15 (arrow β direction), from the power point Pw toward the neutral point Nw. Along the circumferential directions of the stator core 15, the W-phase coil Cw may be wound on the stator core 15 in the direction opposite to the U-phase coil Cu and the V-phase coil Cv described above. As illustrated in FIG. 5, FIG. 17, and FIG. 18, the power point Pw of the W-phase coil Cw may extend from the second position of the slot S10, and the neutral point Nw of the W-phase coil Cw may extend from the first position of the slot S3.

[Structure of Busbar Unit]

Figure 19:
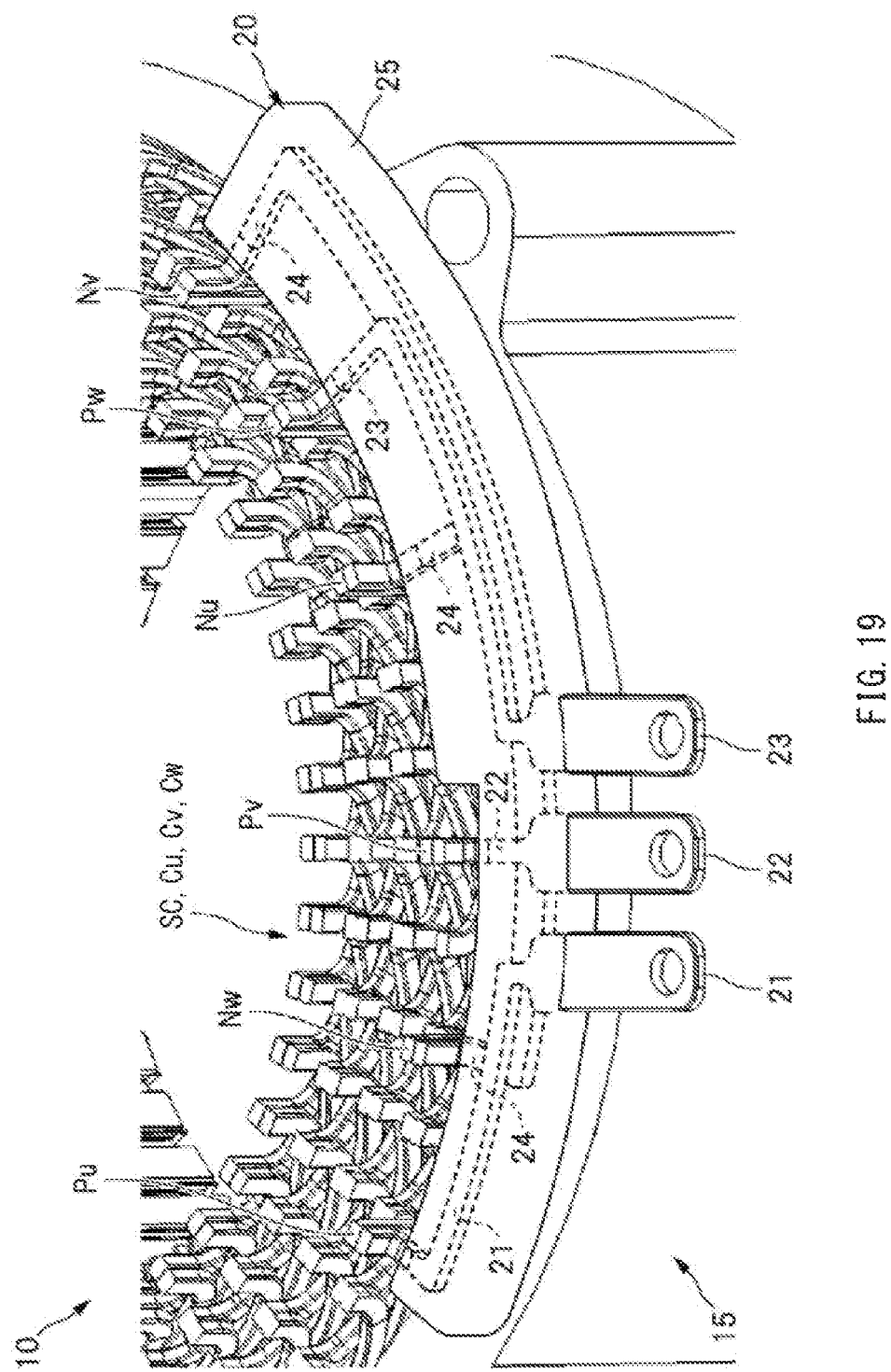
FIG. 19 is a perspective view of an internal structure of a busbar unit.
Figure 20:
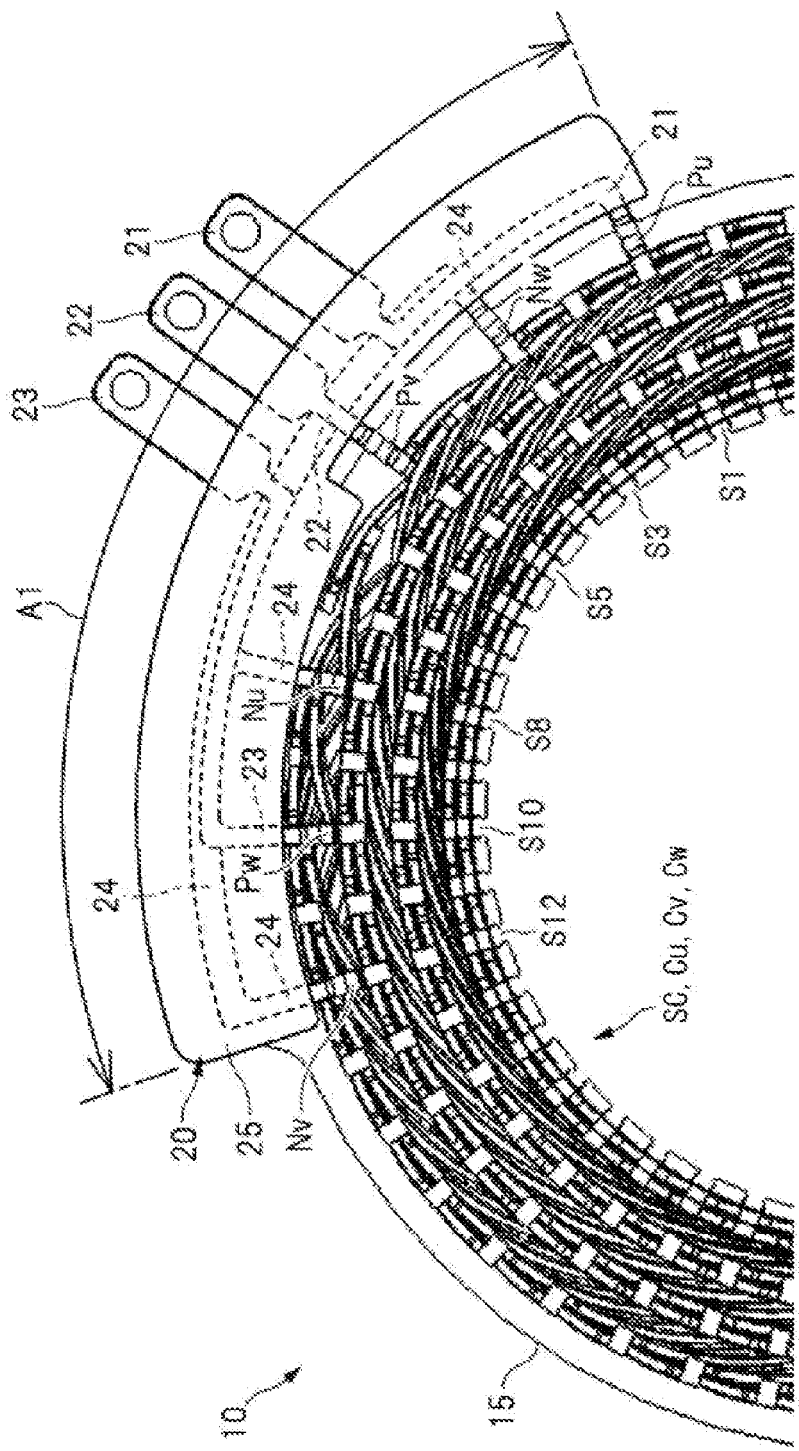
FIG. 20 is a side view of the internal structure of the busbar unit.
Figure 21:
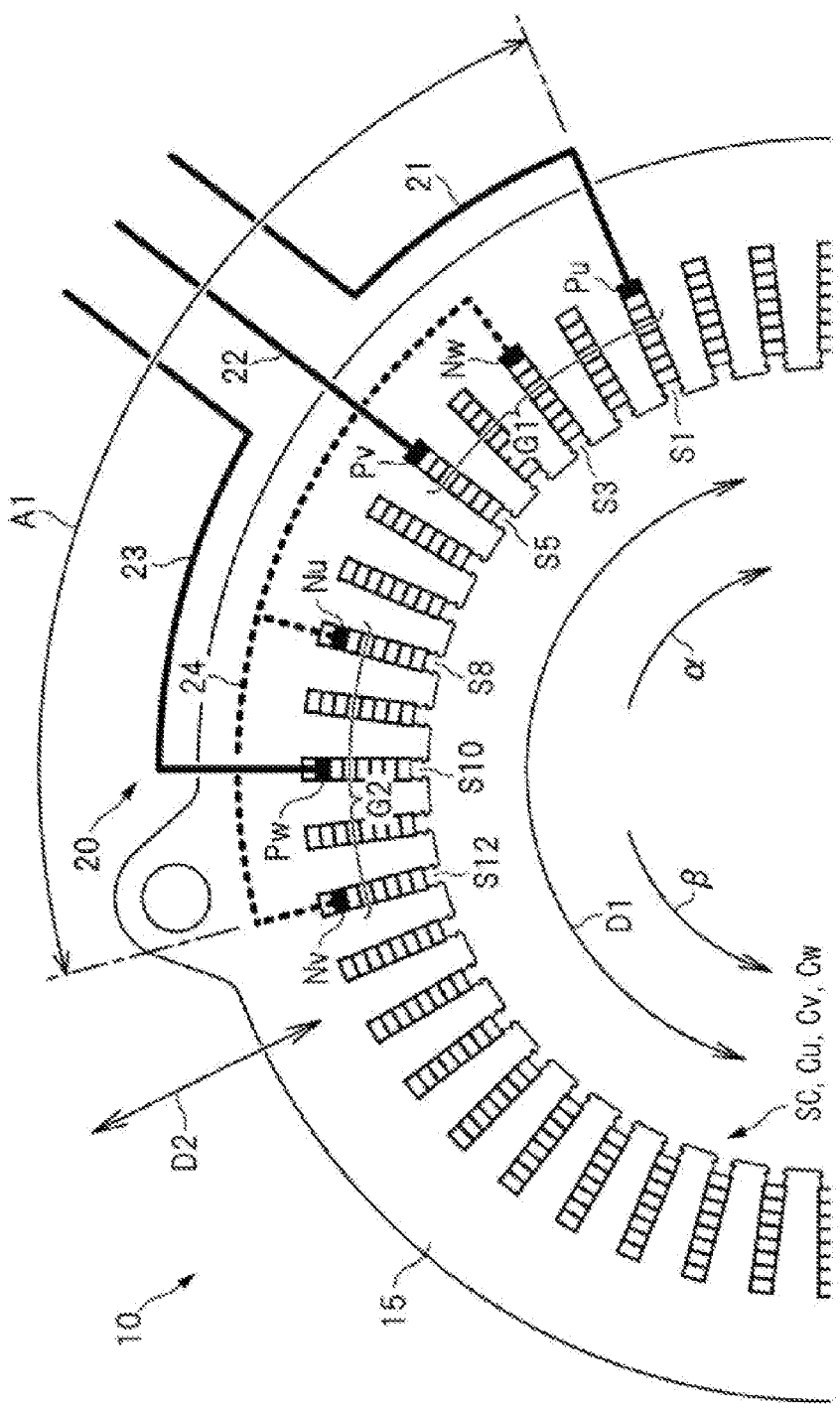
FIG. 21 is a diagram schematically illustrating a connection structure of the busbar unit.

Now, the busbar unit 20 coupled to the stator coil SC will be described. FIG. 19 is a perspective view of an internal structure of the busbar unit 20. FIG. 20 is a side view of the internal structure of the busbar unit 20. FIG. 21 schematically illustrates a connection structure of the busbar unit 20.

As illustrated in FIG. 19 and FIG. 20, the busbar unit 20 may include the four busbars 21 to 24 and the insulating member 25 holding the busbars 21 to 24. The busbars 21 to 24 may include a metal material such as copper. The busbar unit 20 includes, as the busbars 21 to 23, the first power busbar 21 coupled to the power point Pu of the U-phase coil Cu, the second power busbar 22 coupled to the power point Pv of the V-phase coil Cv, and the third power busbar 23 coupled to the power point Pw of the W-phase coil Cw. The busbar unit 20 includes, as the busbar 24, the neutral busbar 24 coupled to the neutral point Nu of the U-phase coil Cu, the neutral point Nv of the V-phase coil Cv, and the neutral point Nw of the W-phase coil Cw. The insulating member 25 of the busbar unit 20 may include an insulating resin such as polyethylene. In one embodiment, the busbar unit 20 may serve as a "busbar unit", the first power busbar 21 may serve as a "first power busbar", the second power busbar 22 may serve as a "second power busbar", the third power busbar 23 may serve as a "third power busbar", and the neutral busbar 24 may serve as a "neutral busbar". In one embodiment, the insulating member 25 may serve as an "insulating member".

As described above, the power point Pu of the U-phase coil Cu may extend from the slot S1, and the neutral point Nu of the U-phase coil Cu may extend from the slot S8. The power point Pv of the V-phase coil Cv may extend from the slot S5, and the neutral point Nv of the V-phase coil Cv may extend from the slot S12. The power point Pw of the W-phase coil Cw may extend from the slot S10, and the neutral point Nw of the W-phase coil Cw may extend from the slot S3. In other words, as illustrated in FIG. 21, in circumferential directions D1 of the stator core 15, the neutral point Nw of the W-phase coil Cw may be disposed between the power point Pu of the U-phase coil Cu and the power point Pv of the V-phase coil Cv. In the circumferential directions D1 of the stator core 15, the power point Pw of the W-phase coil Cw may be disposed between the neutral point Nu of the U-phase coil Cu and the neutral point Nv of the V-phase coil Cv. Thus disposing the power point Pw between the neutral points Nu and Nv and disposing the neutral point Nw between the power points Pu and Pv makes it possible to bring the power points Pu, Pv, and Pw and the neutral points Nu, Nv, and Nw close to one another, which helps to downsize the busbar unit 20.

As illustrated in FIG. 21, the U-phase coil Cu wound from the slot S1 to reach the slot S8 may be wound on the stator core 15, while progressing in one of the circumferential directions of the stator core 15 (arrow a direction). The V-phase coil Cv wound from the slot S5 to reach the slot S12 may be wound on the stator core 15, while progressing in one of the circumferential directions of the stator core 15 (arrow a direction). In contrast, the W-phase coil Cw wound from the slot S10 to reach the slot S3 may be wound on the stator core 15, while progressing in the other of the circumferential directions of the stator core 15 (arrow β direction). Thus winding the W-phase coil Cw on the stator core 15 in the direction opposite to the U-phase coil Cu and the V-phase coil Cv makes it possible to dispose the power point Pw between the neutral points Nu and Nv, and dispose the neutral point Nw between the power points Pu and Pv. This makes it possible to bring the power points Pu, Pv, and Pw and the neutral points Nu, Nv, and Nw close to one another, which helps to downsize the busbar unit 20.

Downsizing the busbar unit 20 as described above makes it possible to reduce mass and cost of the busbar unit 20. Downsizing the busbar unit 20 makes it possible to, as well as reducing the mass of the busbar unit 20, narrow intervals between the power points Pu, Pv, and Pw and the neutral points Nu, Nv, and Nw that support the busbar unit 20. This makes it possible to increase natural frequency of the busbar unit 20, making it possible to reduce vibration of the busbar unit 20 and improve durability.

As illustrated in FIG. 21, in the stator 10 according to the example embodiment, a first connection point group G1 may include the neutral point Nw of the W-phase coil Cw, the power point Pu of the U-phase coil Cu, and the power point Pv of the V-phase coil Cv. A second connection point group G2 may include the power point Pw of the W-phase coil Cw, the neutral point Nu of the U-phase coil Cu, and the neutral point Nv of the V-phase coil Cv. The first connection point group G1 and the second connection point group G2 may be disposed without overlapping each other in radial directions D2 of the stator core 15. In other words, a region occupied by the first connection point group G1 in the circumferential directions D1 of the stator core 15 and a region occupied by the second connection point group G2 in the circumferential directions D1 of the stator core 15 may be disposed without overlapping each other in the radial directions D2, and may be disposed alternately in the circumferential directions D1. For example, in the stator 10 according to the example embodiment, the first connection point group G1 and the second connection point group G2 may be disposed not to be adjacent to each other in the circumferential directions D1 of the stator core 15. In other words, the first connection point group G1 and the second connection point group G2 may be disposed apart from each other in the circumferential directions D1 of the stator core 15. In one embodiment, the first connection point group G1 may serve as a "first connection point group", and the second connection point group G2 may serve as a "second connection point group".

Comparative Example

Figure 22:
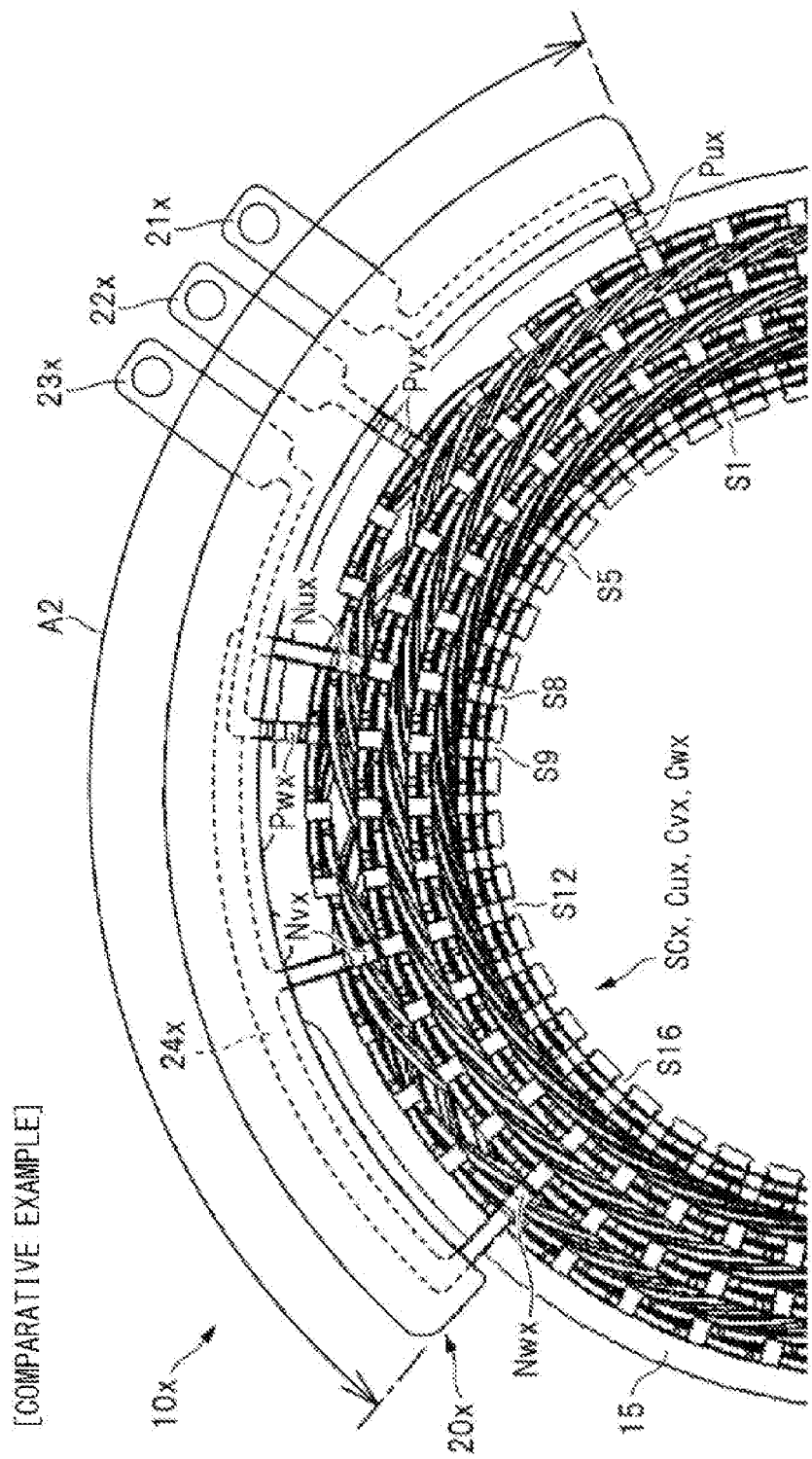
FIG. 22 is a side view of an internal structure of a busbar unit provided in a stator according to a comparative example.
Figure 23:
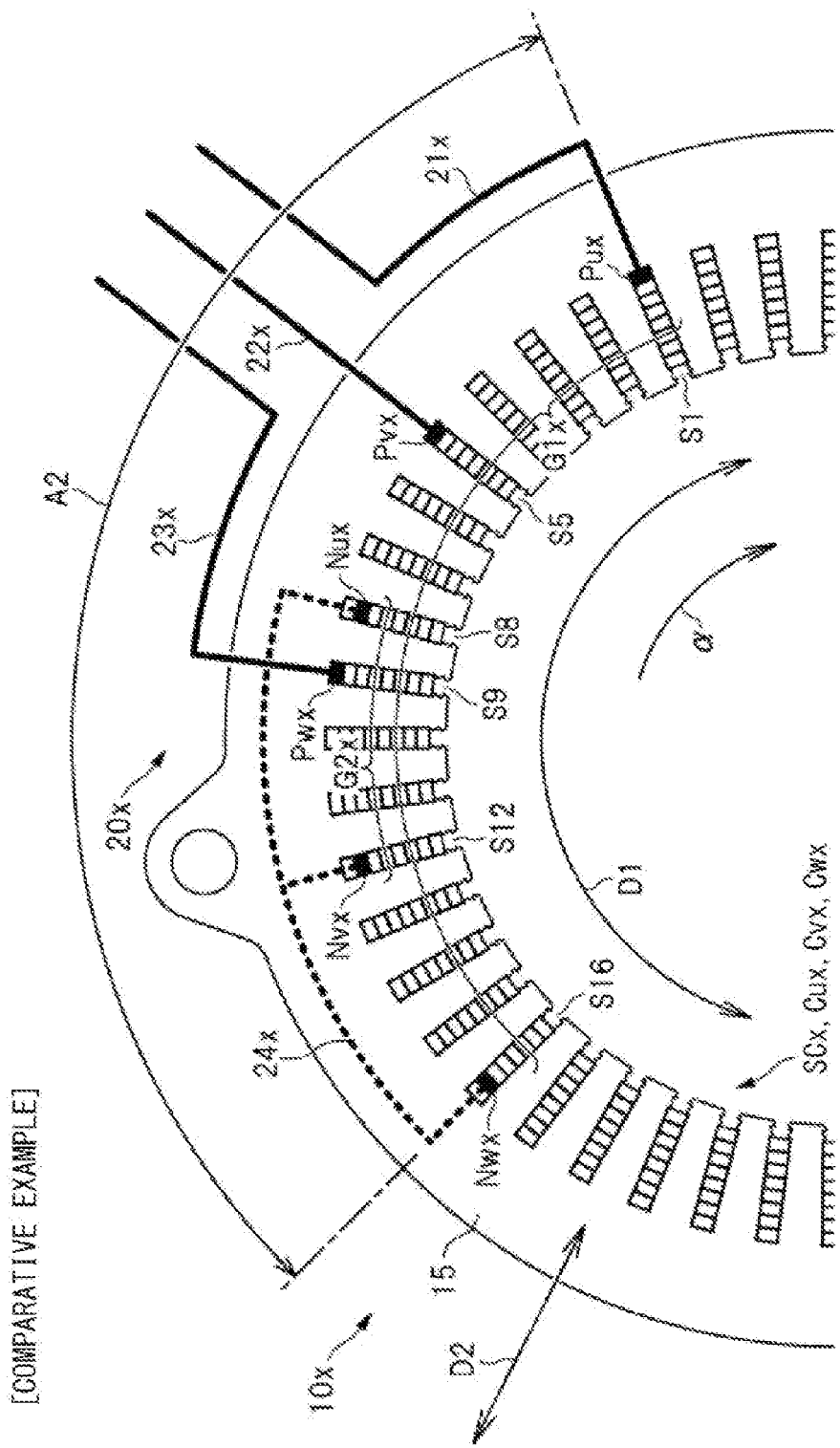
FIG. 23 is a diagram schematically illustrating a connection structure of the busbar unit provided in the stator according to the comparative example.

Now, a stator 10x according to a comparative example will be described. FIG. 22 is a side view of an internal structure of a busbar unit 20x provided in the stator 10x according to the comparative example. FIG. 23 schematically illustrates a connection structure of the busbar unit 20x provided in the stator 10x according to the comparative example. In the following description, a U-phase coil Cux, a V-phase coil Cvx, power points Pux and Pvx, and neutral points Nux and Nvx included in the stator 10x according to the comparative example are denoted by numerals additionally including "x" to be distinguished from the example embodiment. However, structures and positions of these elements are the same as those of the U-phase coil Cu, the V-phase coil Cv, the power points Pu and Pv, and the neutral points Nu and Nv described above.

The stator 10x according to the comparative example illustrated in FIG. 22 and FIG. 23 includes a stator coil SCx including the U-phase coil Cux, the V-phase coil Cvx, and a W-phase coil Cwx. These phase coils Cux, Cvx, and Cwx have the same coil structure as the U-phase and V-phase coils Cu and Cv according to the example embodiment described above. In other words, the W-phase coil Cwx is wound on the stator core 15 in the direction opposite to the W-phase coil Cw according to the example embodiment described above. In the stator 10x according to the comparative example, the U-phase coil Cux, the V-phase coil Cvx, and the W-phase coil Cwx having the same coil structure are wound on the stator core 15 to be phase-shifted by 120 degrees.

In the stator 10x according to the comparative example, as illustrated in FIG. 23, the U-phase coil Cux wound from the slot S1 to reach the slot S8 is wound on the stator core 15, while progressing in one of the circumferential directions of the stator core 15 (arrow α direction). The V-phase coil Cvx wound from the slot S5 to reach the slot S12 is wound on the stator core 15, while progressing in one of the circumferential directions of the stator core 15 (arrow α direction). The W-phase coil Cwx wound from the slot S9 to reach the slot S16 is wound on the stator core 15, while progressing in one of the circumferential directions of the stator core 15 (arrow α direction). Thus, the power point Pux of the U-phase coil Cux is disposed in the slot S1, and the neutral point Nux of the U-phase coil Cux is disposed in the slot S8. The power point Pvx of the V-phase coil Cvx is disposed in the slot S5, and the neutral point Nvx of the V-phase coil Cvx is disposed in the slot S12. A power point Pwx of the W-phase coil Cwx is disposed in the slot S9, and a neutral point Nwx of the W-phase coil Cwx is disposed in the slot S16.

As illustrated in FIG. 22 and FIG. 23, the busbar unit 20x coupled to the stator coil SCx includes a power busbar 21x coupled to the power point Pux of the U-phase coil Cux, a power busbar 22x coupled to the power point Pvx of the V-phase coil Cvx, and a power busbar 23x coupled to the power point Pwx of the W-phase coil Cwx. The busbar unit 20x also includes a neutral busbar 24x coupled to the neutral point Nux of the U-phase coil Cux, the neutral point Nvx of the V-phase coil Cvx, and the neutral point Nwx of the W-phase coil Cwx.

As described above, in the stator 10x according to the comparative example, the power points Pux, Pvx, and Pwx are disposed to be evenly spaced, and the neutral points Nux, Nvx, and Nwx are disposed to be evenly spaced. This makes it difficult to bring the power points Pux, Pvx, and Pwx and the neutral points Nux, Nvx, and Nwx close to one another, making it difficult to downsize the busbar unit 20x. In the stator 10x including the busbar unit 20x, it is advantageous to downsize the busbar unit 20x in downsizing the stator 10x. In the stator 10x according to the comparative example, the busbar unit 20x extending at an angle A2 (about 120 degrees) is to be used, as illustrated in FIG. 22 and FIG. 23. In contrast, in the stator 10 according to the example embodiment described above, it is possible to use the busbar unit 20 extending at a smaller angle, e.g., an angle A1 (about 90 degrees) smaller than the angle A2, as illustrated in FIG. 20 and FIG. 21. In the busbar unit 20, the power points Pu, Pv, and Pw may be disposed to be unevenly spaced and the neutral points Nu, Nv, and Nw may be disposed to be unevenly spaced. This makes it possible to downsize the busbar unit 20, which helps to promote downsizing of the stator 10.

As illustrated in FIG. 23, in the stator 10x according to the comparative example, a first connection point group G1x includes the neutral point Nwx of the W-phase coil Cwx, the power point Pux of the U-phase coil Cux, and the power point Pvx of the V-phase coil Cvx. A second connection point group G2x includes the power point Pwx of the W-phase coil Cwx, the neutral point Nux of the U-phase coil Cux, and the neutral point Nvx of the V-phase coil Cvx. The first connection point group G1x and the second connection point group G2x are disposed to overlap each other in the radial directions D2 of the stator core 15. In other words, in the stator 10x according to the comparative example, the first connection point group G1x and the second connection point group G2x are disposed to be adjacent to each other in the circumferential directions D1 of the stator core 15. The first connection point group G1x and the second connection point group G2x are disposed to overlap each other in the circumferential directions D1 of the stator core 15.

The technology is not limited to the example embodiments, and various modifications may be made without departing from the scope of the technology. In the above description, the U-phase coil Cu may be used as the first phase winding, the V-phase coil Cv may be used as the second phase winding, and the W-phase coil Cw may be used as the third phase winding. Without being limited to this example, the U-phase coil Cu may be used as the second phase winding or the third phase winding, the V-phase coil Cv may be used as the first phase winding or the third phase winding, and the W-phase coil Cw may be used as the first phase winding or the second phase winding. In the above description, the segment coils 40 may be coupled to each other in series to configure each of the phase coils Cu, Cv, and Cw. Without being limited to this example, the segment coils 40 may be coupled to each other in series to configure a series coil group, and a plurality of series coil groups may be coupled to each other in parallel to configure each of the phase coils Cu, Cv, and Cw.

In the illustrated example, eight segment coils 40 may be inserted into one slot. Without being limited to this example, more than eight segment coils 40 may be inserted into one slot, or less than eight segment coils 40 may be inserted into one slot. In the above description, the stator core 15 including 48 slots may be used. Without being limited to this example, the stator core 15 to be used may include another number of slots.

The invention claimed is:

1. A stator to be provided in an electric rotating machine, the stator comprising:
   a stator core having a cylindrical shape and a plurality of slots;
   a first phase winding including a plurality of segment conductors inserted into the slots, and having a power point and a neutral point each protruding from an end face of the stator core;
   a second phase winding including a plurality of segment conductors inserted into the slots, and having a power point and a neutral point each protruding from the end face of the stator core;
   a third phase winding including a plurality of segment conductors inserted into the slots, and having a power point and a neutral point each protruding from the end face of the stator core; and
   a busbar unit that includes a first power busbar coupled to the power point of the first phase winding, a second power busbar coupled to the power point of the second phase winding, a third power busbar coupled to the power point of the third phase winding, and a neutral busbar coupled to the neutral points of the first phase winding, the second phase winding, and the third phase winding,
   wherein, in circumferential directions of the stator core, the neutral point of the third phase winding is disposed between the power point of the first phase winding and the power point of the second phase winding, and the power point of the third phase winding is disposed between the neutral point of the first phase winding and the neutral point of the second phase winding.

2. The stator according to claim 1, wherein
   the first phase winding and the second phase winding are each wound on the stator core, while progressing in one of the circumferential directions of the stator core, from the power point toward the neutral point, and
   the third phase winding is wound on the stator core, while progressing in the other of the circumferential directions of the stator core, from the power point toward the neutral point.

3. The stator according to claim 1, further comprising:
   a first connection point group including the neutral point of the third phase winding, the power point of the first phase winding, and the power point of the second phase winding; and
   a second connection point group including the power point of the third phase winding, the neutral point of the first phase winding, and the neutral point of the second phase winding,
   wherein the first connection point group and the second connection point group are disposed without overlapping each other in a radial direction of the stator core.

4. The stator according to claim 2, further comprising:
   a first connection point group including the neutral point of the third phase winding, the power point of the first phase winding, and the power point of the second phase winding; and a second connection point group including the power point of the third phase winding, the neutral point of the first phase winding, and the neutral point of the second phase winding, wherein the first connection point group and the second connection point group are disposed without overlapping each other in a radial direction of the stator core.

5. The stator according to claim 1, wherein the busbar unit includes an insulating member that holds the first power busbar, the second power busbar, the third power busbar, and the neutral busbar.

6. The stator according to claim 2, wherein the busbar unit includes an insulating member that holds the first power busbar, the second power busbar, the third power busbar, and the neutral busbar.

7. The stator according to claim 3, wherein the busbar unit includes an insulating member that holds the first power busbar, the second power busbar, the third power busbar, and the neutral busbar.

8. The stator according to claim 4, wherein the busbar unit includes an insulating member that holds the first power busbar, the second power busbar, the third power busbar, and the neutral busbar.

9. An electric rotating machine comprising:
the stator according to claim 1; and
a rotor including a plurality of permanent magnets arranged in the circumferential directions, and provided on an inner circumference side of the stator to be relatively rotatable with respect to the stator.

10. An electric rotating machine comprising:
the stator according to claim 2; and
a rotor including a plurality of permanent magnets arranged in the circumferential directions, and provided on an inner circumference side of the stator to be relatively rotatable with respect to the stator.

11. An electric rotating machine comprising:
the stator according to claim 3; and
a rotor including a plurality of permanent magnets arranged in the circumferential directions, and provided on an inner circumference side of the stator to be relatively rotatable with respect to the stator.

12. An electric rotating machine comprising:
the stator according to claim 4; and
a rotor including a plurality of permanent magnets arranged in the circumferential directions, and provided on an inner circumference side of the stator to be relatively rotatable with respect to the stator.

13. An electric-powered vehicle comprising the electric rotating machine according to claim 9 as a driving source.

14. An electric-powered vehicle comprising the electric rotating machine according to claim 10 as a driving source.

15. An electric-powered vehicle comprising the electric rotating machine according to claim 11 as a driving source.

16. An electric-powered vehicle comprising the electric rotating machine according to claim 12 as a driving source.

17. A stator to be provided in an electric rotating machine, the stator comprising:
a stator core having a cylindrical shape and a plurality of slots;
a first phase winding including a plurality of segment conductors inserted into the slots, and having a power point and a neutral point each protruding from an end face of the stator core;
a second phase winding including a plurality of segment conductors inserted into the slots, and having a power point and a neutral point each protruding from the end face of the stator core;
a third phase winding including a plurality of segment conductors inserted into the slots, and having a power point and a neutral point each protruding from the end face of the stator core; and
a busbar unit that includes a first power busbar coupled to the power point of the first phase winding, a second power busbar coupled to the power point of the second phase winding, a third power busbar coupled to the power point of the third phase winding, and a neutral busbar coupled to the neutral points of the first phase winding, the second phase winding, and the third phase winding,
wherein the first phase winding and the second phase winding are each wound on the stator core, while progressing in one of circumferential directions of the stator core, from the power point toward the neutral point, and
the third phase winding is wound on the stator core, while progressing in the other of the circumferential directions of the stator core, from the power point toward the neutral point.

18. An electric rotating machine comprising:
the stator according to claim 17; and
a rotor including a plurality of permanent magnets arranged in the circumferential directions, and provided on an inner circumference side of the stator to be relatively rotatable with respect to the stator.

19. An electric-powered vehicle comprising the electric rotating machine according to claim 18 as a driving source.

* * * * *